United States Patent
An

(10) Patent No.: US 10,782,928 B2
(45) Date of Patent: Sep. 22, 2020

(54) APPARATUS AND METHOD FOR PROVIDING VARIOUS AUDIO ENVIRONMENTS IN MULTIMEDIA CONTENT PLAYBACK SYSTEM

(71) Applicant: HUMAX CO., LTD., Yongin (KR)

(72) Inventor: Byoung Man An, Seongnam-si (KR)

(73) Assignee: HUMAX CO., LTD., Yongin-si (KR)

( * ) Notice: Subject to any disclaimer, the term of this patent is extended or adjusted under 35 U.S.C. 154(b) by 0 days.

(21) Appl. No.: 16/212,637

(22) Filed: Dec. 6, 2018

(65) Prior Publication Data

US 2019/0179600 A1 Jun. 13, 2019

(30) Foreign Application Priority Data

Dec. 11, 2017 (KR) .................. 10-2017-0168914

(51) Int. Cl.
| | |
|---|---|
| *H03G 3/20* | (2006.01) |
| *G06F 3/16* | (2006.01) |
| *H04N 21/439* | (2011.01) |
| *H04N 21/422* | (2011.01) |
| *G10L 21/0316* | (2013.01) |
| *G10L 21/02* | (2013.01) |

(Continued)

(52) U.S. Cl.
CPC .......... *G06F 3/165* (2013.01); *G10L 21/0202* (2013.01); *G10L 21/0316* (2013.01); *H04N 21/4221* (2013.01); *H04N 21/42215* (2013.01); *H04N 21/4394* (2013.01); *G10L 21/0272* (2013.01)

(58) Field of Classification Search
CPC . G06F 3/165; G10L 21/0202; G10L 21/0316; G10L 21/0272; H04N 21/4221; H04N 21/42215; H04N 21/4394

USPC .......................................... 381/104–109, 57
See application file for complete search history.

(56) References Cited

U.S. PATENT DOCUMENTS

| 5,603,625 A | * | 2/1997 | Tondreault | H05K 7/1409 |
|---|---|---|---|---|
| | | | | 439/157 |
| 2007/0044137 A1 | * | 2/2007 | Bennett | G10H 1/368 |
| | | | | 725/141 |

(Continued)

FOREIGN PATENT DOCUMENTS

| KR | 10-2000-0028179 A | 5/2000 |
|---|---|---|
| KR | 10-2008-0099844 A | 11/2008 |
| KR | 10-2015-0127134 A | 11/2015 |

OTHER PUBLICATIONS

Extended European Search Report issued by European Patent Office dated Jul. 9, 2019.

*Primary Examiner* — Ammar T Hamid

(57) ABSTRACT

An apparatus and method for providing various audio environments in a multimedia content playback system are disclosed. The content processing terminal of the multimedia content playback system includes an audio signal processor for processing the audio source of multimedia content to produce a voice source and a background source, a controller for controlling the audio signal processor to adjust at least one of the voice source and the background source in accordance with a volume control signal, a GUI processor for acquiring a graphical user interface (GUI) component corresponding to the volume control signal, and a display processor for processing the GUI component and providing the processed GUI component to a display device.

21 Claims, 26 Drawing Sheets

(51) Int. Cl.
  *H03G 3/00*       (2006.01)
  *G10L 21/0272*    (2013.01)

(56) References Cited

U.S. PATENT DOCUMENTS

| | | | | |
|---|---|---|---|---|
| 2007/0172140 A1* | 7/2007 | Kokemohr | ............... | G06K 9/40 |
| | | | | 382/261 |
| 2009/0076814 A1* | 3/2009 | Lee | ......................... | G10L 25/78 |
| | | | | 704/233 |
| 2013/0121506 A1* | 5/2013 | Mysore | ................. | G10L 21/028 |
| | | | | 381/94.2 |
| 2016/0072466 A1* | 3/2016 | Kuromusha | ............. | H03G 3/04 |
| | | | | 381/107 |
| 2016/0148623 A1* | 5/2016 | Yamanashi | ............ | G10L 21/028 |
| | | | | 725/116 |
| 2017/0195819 A1* | 7/2017 | Harder | .................... | H04S 3/008 |

\* cited by examiner

APPARATUS AND METHOD FOR PROVIDING VARIOUS AUDIO ENVIRONMENTS IN MULTIMEDIA CONTENT PLAYBACK SYSTEM

CROSS-REFERENCE TO RELATED APPLICATION

This application claims priority under 35 U.S.C. 119(a) to Korean Patent Application No. 10-2017-0168914, filed on Dec. 11, 2017 in the Korean Intellectual Property Office, the disclosure of which is incorporated herein by reference.

BACKGROUND

Field of the Disclosure

The present disclosure relates to a multimedia content playback system, and more particularly, to an apparatus and method for providing various audio environments in a multimedia content playback system. For example, the multimedia content playback system may include a device for receiving broadcast signals and transmitting the broadcast signals to a display device, and the various audio environments may be user-friendly volume control environments.

Description of the Related Art

In general, multimedia content playback systems include an audio/video (A/V) system.

For example, a set-top box (STB) includes an A/V system. An STB may appropriately convert audio and video sources received from the outside into audio and video signals, and may transmit the audio and video signals to display devices such as televisions.

In addition to terrestrial broadcasting signals, an STB may receive Internet Protocol television (IPTV) signals, cable broadcasting signals, satellite broadcasting signals, or the like, and may transmit the signals to a display device.

In recent years, acoustic processing techniques for separating an audio source into voices and sounds other than voices and for individually setting volumes have been applied to A/V systems.

In this case, the sounds other than voices may be referred to as background sounds (hereinafter, simply referred to as backgrounds).

For example, the audio source separation function may also be considered as an option in audio playback in televisions.

However, it is difficult to apply audio source separation function according to conventional techniques to multimedia content playback systems capable of providing various types of content, such as an STB.

In addition, as the way of consuming content becomes diverse, a highly adaptable and user-friendly audio environment is required.

SUMMARY

Therefore, the present disclosure has been made in view of the above problems, and it is an object of the present disclosure to provide an apparatus and method for providing various audio control environments in accordance with the trend of diversification of types of multimedia content.

It is another object of the present disclosure to provide an apparatus and method for providing an audio environment suitable for an environment in which multimedia content is provided in various manners.

It is another object of the present disclosure to provide an audio source separation function that may be easily applied to existing multimedia provision systems irrespective of methods of producing audio sources.

It is yet another object of the present disclosure to provide an apparatus and method for providing various audio control environments that may reflect user preference and that enable a user to easily and conveniently use multimedia content.

According to one embodiment of the present disclosure, a control means capable of independently controlling the volumes of a voice source and a background source for each type or genre of multimedia content may be provided, and an interface capable of adjusting various audio environments based on user profiles may be provided. Thus, various audio control environments may be provided to a user.

In addition, in the case of an audio source included in existing broadcast content, voice and background are not separated from the audio source. The present disclosure may provide a means for separating the audio source. The means may be easily applied to existing multimedia provision systems irrespective of methods of producing audio sources.

In addition, according to embodiments of the present disclosure, a graphical user interface according to the type or genre characteristics of content may be provided so that a user may use multimedia content easily and conveniently.

In accordance with the present disclosure, the above and other objects can be accomplished by the provision of a content processing terminal of a multimedia content playback system, including an audio signal processor for processing a voice signal separated from the audio source of multimedia content to produce a voice source and for processing a background signal separated from the audio source to produce a background source; a controller for controlling the audio signal processor to adjust at least one of the voice source and the background source in accordance with a volume control signal; a GUI processor for acquiring a graphical user interface (GUI) component corresponding to the volume control signal; and a display processor for processing the GUI component and providing the processed GUI component to a display device.

In accordance with an aspect of the present disclosure, the above and other objects can be accomplished by the provision of a content processing terminal of a multimedia content playback system, including a first audio signal separator for separating the audio source of multimedia content into a first voice signal and a first background signal using a first audio separation algorithm; a second audio signal separator for separating the audio source of the multimedia content into a second voice signal and a second background signal using a second audio separation algorithm; a voice enhancer for generating enhanced voice sources based on the signal features of each of the first and second voice signals; a background enhancer for generating enhanced background sources based on the signal features of each of the first and second background signals; and a volume controller for separating the volume level of the enhanced voice source and the volume level of the enhanced background source based on a volume control signal.

In accordance with another aspect of the present disclosure, there is provided a content processing terminal of a multimedia content playback system, including a selector for selecting a voice enhancement procedure or a background enhancement procedure according to the type of multimedia content or user setting; a voice enhancement audio source part, in which a first audio separation function of separating the audio source of the multimedia content into a first voice signal and a first background signal using a first audio separation algorithm and a voice enhancement function of generating an enhanced voice source are activated in the voice enhancement procedure; a background enhancement audio source part, in which a second audio separation function of separating the audio source of the multimedia content into a second voice signal and a second background signal using a second audio separation algorithm and a background enhancement function of generating an enhanced background source are activated in the background enhancement procedure; and a volume controller for separating the volume level of the enhanced voice source and the volume level of the enhanced background source based on a volume control signal, wherein, in the voice enhancement audio source part, the voice enhancement function is deactivated in the background enhancement procedure, and in the background enhancement audio source part, the background enhancement function is deactivated in the voice enhancement procedure; the voice enhancement function serves to generate enhanced voice sources based on the signal features of each of the first and second voice signals; and the background enhancement function serves to generate enhanced background sources based on the signal features of each of the first and second background signals.

In accordance with yet another aspect of the present disclosure, there is provided a method of providing the audio environment of a content processing terminal, including a step of processing a voice signal separated from the audio source of multimedia content to produce a voice source; a step of processing a background signal separated from the audio source to produce a background source; a step of adjusting at least one of the voice source and the background source according to a volume control signal; and a step of confirming a graphical user interface (GUI) component corresponding to the volume control signal, processing the GUI component, and providing the processed GUI component to a display device.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Figure 1:
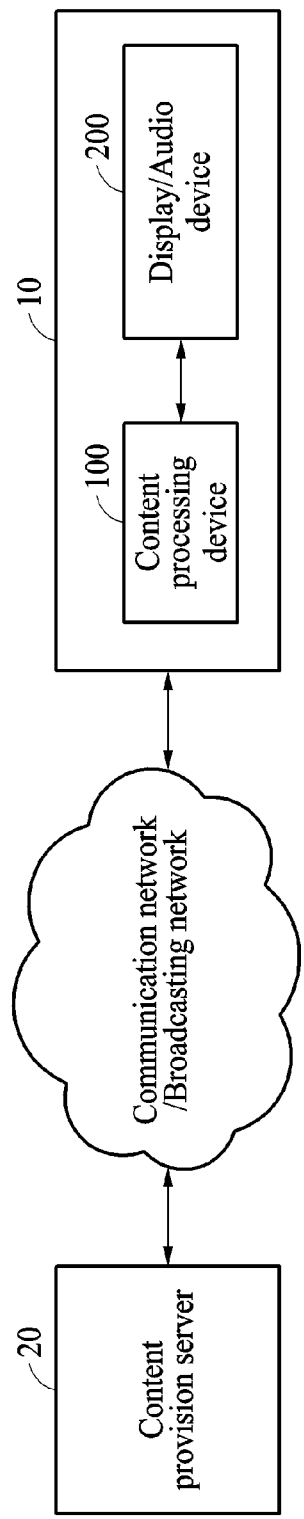
FIG. 1 is a block diagram for explaining a multimedia content provision system according to one embodiment.

The present disclosure will now be described more fully with reference to the accompanying drawings and contents disclosed in the drawings. However, the present disclosure should not be construed as limited to the exemplary embodiments described herein.

The terms used in the present specification are used to explain a specific exemplary embodiment and not to limit the present inventive concept. Thus, the expression of singularity in the present specification includes the expression of plurality unless clearly specified otherwise in context. It will be further understood that the terms "comprise" and/or "comprising", when used in the present specification, specify the presence of stated components, steps, operations, and/or elements, but do not preclude the presence or addition of one or more other components, steps, operations, and/or elements thereof.

It should not be understood that arbitrary aspects or designs disclosed in "embodiments", "examples", "aspects", etc. used in the specification are more satisfactory or advantageous than other aspects or designs.

In addition, the expression "or" means "inclusive or" rather than "exclusive or". That is, unless otherwise mentioned or clearly inferred from context, the expression "x uses a or b" means any one of natural inclusive permutations.

In addition, as used in the description of the disclosure and the appended claims, the singular form "a" or "an" is intended to include the plural forms as well, unless context clearly indicates otherwise.

The terms such as "first" and "second" are used herein merely to describe a variety of constituent elements, but the constituent elements are not limited by the terms. The terms are used only for the purpose of distinguishing one constituent element from another constituent element.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In addition, in the following description of the present disclosure, a detailed description of known functions and configurations incorporated herein will be omitted when it may make the subject matter of the present disclosure unclear. The terms used in the specification are defined in consideration of functions used in the present disclosure, and can be changed according to the intent or conventionally used methods of clients, operators, and users. Accordingly, definitions of the terms should be understood on the basis of the entire description of the present specification.

FIG. 1 is a block diagram for explaining a multimedia content provision system according to one embodiment.

Referring to FIG. 1, the multimedia content provision system includes a content provision server 20 and a user terminal 10.

The content provision server 20 may provide multimedia content such as VOD, real-time broadcasting content, and movies to the user terminal 10.

The user terminal 10 may play multimedia content, terrestrial broadcasting, recorded content, and the like provided from the content provision server 20.

In this case, the user terminal 10 may include a content processing device 100 and a display/audio device 200.

The content processing device 100 may be represented as a content processing terminal and may include, for example, an STB, a user computer, a portable terminal, and the like.

The display/audio device 200 may be, for example, a television including an A/V system.

Figure 2:
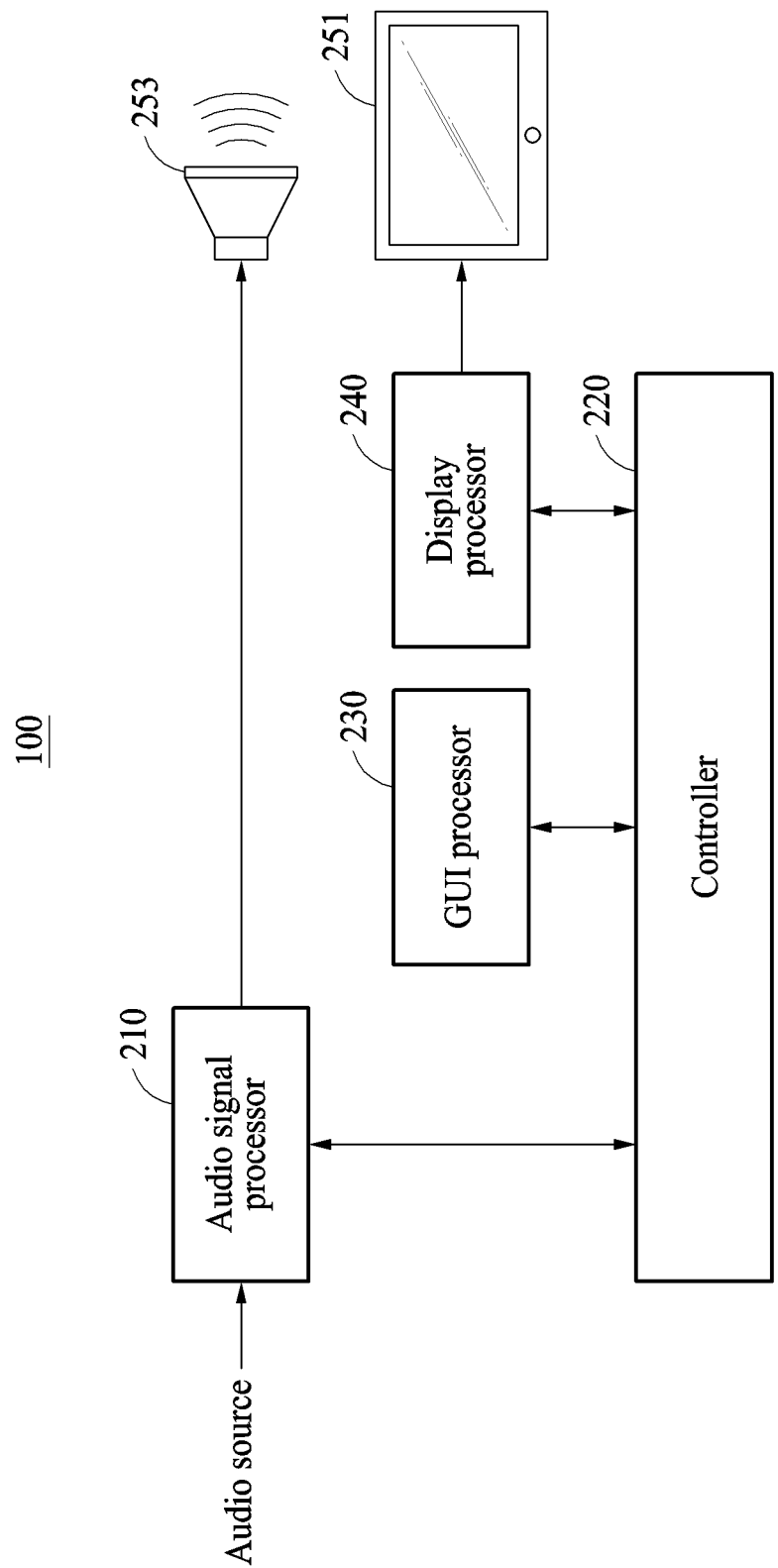
FIGS. 2 and 3 are block diagrams for explaining the configuration of a content processing terminal according to one embodiment.
Figure 3:
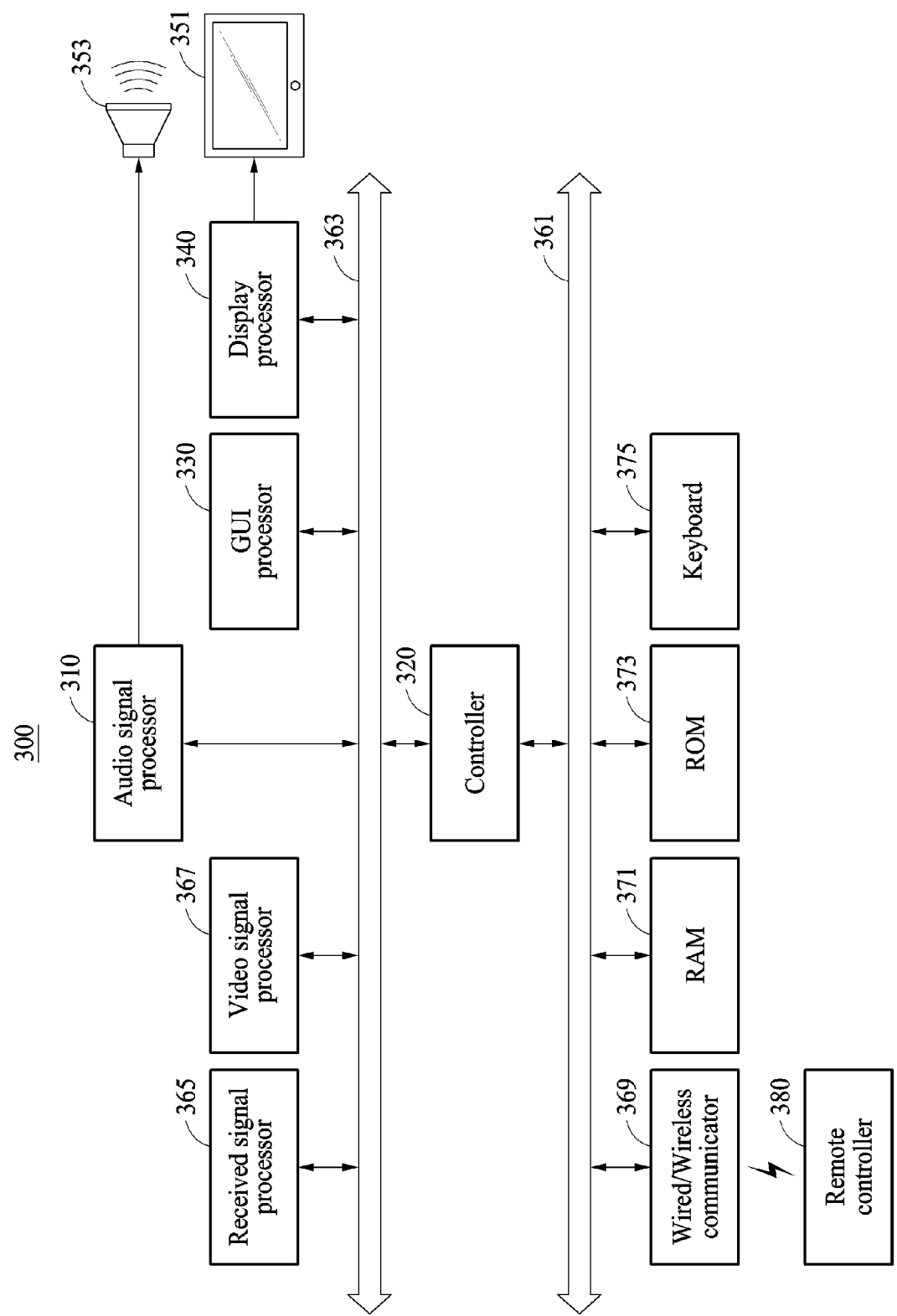

FIGS. 2 and 3 are block diagrams for explaining the configuration of a content processing terminal according to one embodiment.

Referring to FIG. 2, a content processing terminal 100 includes an audio signal processor 210, a controller 220, a graphical user interface (GUI) processor 230, and a display processor 240.

The audio signal processor 210 produces a voice source and a background source from the audio source of multimedia content.

In this case, the voice source may include conversations in movies or dramas, music vocals, announcer's or reporter's comments in news content, the narration sounds of advertisements, announcer's comments and commentaries in sports content, and the like.

The background source may be sounds excluding voices from the audio source, and may include, for example, background music, field sounds in a sports broadcast, and the like.

The voice source and background source output from the audio signal processor 210 may be provided to an audio output device 253 of an A/V system.

In this case, the audio output device 253 may be installed in the display/audio device 200 instead of the content processing terminal 100. The audio output device 253 may be composed of a plurality of audio output devices rather than a single device. For example, the audio output device 253 may be configured as left/right speakers installed in a television, a multichannel speaker connected to a television by wires, a Bluetooth speaker, or a wired or wireless headphone.

The audio signal processor 210 may transmit the voice source and background source to a plurality of devices, respectively, under control of the controller 220.

For example, the voice source may be transmitted to wireless headphones worn by a user, and the background source may be transmitted to left/right speakers installed in a television. Conversely, the background source may be transmitted to wireless headphones worn by a user, and the voice source may be muted or transmitted to left/right speakers installed in a television.

In this case, selection of the audio output devices may be determined according to user preference, information predetermined by a user, and the type of multimedia content. For example, when the type of multimedia content is music broadcast, the audio signal processor 210 may output both the voice source and background source to a Bluetooth speaker.

The audio signal processor 210 may process a voice signal separated from the audio source of multimedia content to generate a voice source, and may process a background signal separated from the audio source to generate a background source.

The audio signal processor 210 may separate the audio source of multimedia content into a first voice signal and a first background signal using a first audio separation procedure, and may separate the audio source into a second voice signal and a second background signal using a second audio separation procedure.

The audio signal processor 210 may process at least one of the first and second voice signals to generate a voice source.

The audio signal processor 210 may process at least one of the first and second background signals to generate a background source.

Here, the 'first voice signal' and the 'first background signal' may refer to a voice signal and a background signal, respectively, separated through an audio separation algorithm.

In addition, the 'second voice signal' and the 'second background signal' may refer to a voice signal and a background signal, respectively, separated through an audio separation algorithm different from the audio separation algorithm used to separate the 'first voice signal' and the 'first background signal'.

That is, the 'first voice signal' and the 'first background signal' may be obtained through a first audio separation procedure or a first audio separation algorithm, and the 'second voice signal' and the 'second background signal' may be obtained through a second audio separation procedure or a second audio separation algorithm.

In the present specification, the 'voice source' and the 'background source' may refer to audio signals finally provided to the audio output device 253. In addition, the 'voice source' and the 'background source' may be provided to the audio output device 253 in a combined or mixed form.

In addition, in the present specification, when an audio signal finally provided to the audio output device is further processed, the audio signal may be represented by an 'enhanced voice source' and an 'enhanced background source'.

For example, the audio separation algorithm may be related to separating an audio signal into a voice signal and a background signal using audio features in a time domain and audio features in a frequency domain.

For example, a single audio separation algorithm such as support vector machine (SVM), linear discriminant analysis (LDA), Gaussian mixture model (GMM), and k-nearest neighbor (k-NN) may be used as the audio separation algorithm.

Signals separated through the single audio separation algorithm may be reprocessed through an additional audio separation algorithm to ensure good performance.

For example, the audio signal processor 210 may further separate the voice signal and the background signal separated from an audio signal through SVM into a voice signal and a background signal using a probabilistic latent component analysis (PLCA)-based audio separation algorithm.

In the present specification, the voice signal and the background signal separated by a single audio separation algorithm such as SVM may be referred to as a 'voice segment' and 'background segment', respectively.

The controller 220 may control the audio signal processor 210 to adjust at least one of the voice source and the background source according to a volume control signal.

The volume control signal may include at least one of a signal for adjusting the volume level of the voice source independently of the background source, a signal for adjusting the volume level of the background source independently of the voice source, and a signal for adjusting the volume level of a combination of the voice source and the background source.

For example, the volume control signal may be received from a remote controller, and may be a signal that raises the level of a voice signal without adjustment of a background signal. In this case, the controller 220 may control the audio signal processor 210 to increase the level of a voice source.

In the present specification, the 'volume control signal' may refer to both a signal input from the remote controller and a signal transmitted to the audio signal processor 210 for adjusting volume levels.

In addition, in some cases, the 'volume control signal' may refer to a signal for adjusting the volume level of a voice source, a signal for adjusting the volume level of a background source, or a signal for adjusting the volume level of a combination of a voice source and a background source.

The GUI processor 230 may acquire a GUI component corresponding to the volume control signal.

The GUI component may include various graphical objects for representing volume levels. For example, the graphical objects may include volume bar images, transparent bar images, animated images, text images, and the like.

In addition, the graphical objects may be generated in the GUI processor 230, may be stored in the content processing terminal 100, or may be acquired from a separate server through a network.

The display processor 240 may process the GUI component and provide the processed GUI component to a display device 251.

The display processor 240 may provide a video or image signal to the display device 251 through rendering of the GUI component or overlaying the video signal of multimedia content.

In this case, the display device 251 may be installed in the display/audio device 200 instead of the content processing terminal 100. For example, the display device 251 may be the display of a television.

The display device 251 may include a touch panel for receiving touch or a gesture detection sensor for receiving a user's gesture. In this case, signals for touch input and a user's gesture may be transmitted to the controller 220.

In this case, the touch input or the user's gesture may be a signal for volume control.

For example, when touch input for a character is received from a screen on which content is displayed, the controller 220 may transmit a volume control signal to the audio signal processor 210 to adjust voice volume.

At this time, the display device 251 may or may not display volume bars indicating the current levels of voice volume, background volume, and entire volume.

When a volume bar indicating the current level of at least one of voice volume, background volume, and entire volume is displayed, the corresponding volume may be adjusted by the drag gesture of the displayed volume bar.

In the case wherein a volume bar is not displayed, when a predetermined area in the upper left of a screen is touched, the controller 220 may transmit a volume control signal for increasing voice volume to the audio signal processor 210. When a predetermined area in the lower left of a screen is touched, the controller 220 may transmit a volume control signal for decreasing voice volume to the audio signal processor 210. In this case, predetermined areas in the upper right and lower right of a screen may be set as interfaces for adjusting background volume.

Operation of the GUI processor 230 and the display processor 240 are described in various embodiments of this specification, and are described in detail with reference to the examples shown in FIGS. 18 to 24.

FIG. 3 illustrates the configuration of a content processing terminal according to another embodiment.

A content processing terminal 300 shown in FIG. 3 may include an audio signal processor 310, a controller 320, a GUI processor 330, and a display processor 340 that have the same functions as the components shown in FIG. 2.

That is, the audio signal processor 310, the controller 320, the GUI processor 330, and the display processor 340 may have the same functions as the audio signal processor 210, the controller 220, the GUI processor 230, and the display processor 240, respectively.

The specific configuration and operation of the audio signal processors 210 and 310 and the controllers 220 and 320 are described with reference to embodiments through the present specification.

In addition, an audio output device 353 and a display device 351 shown in FIG. 3 may have the same functions as the audio output device 253 and the display device 251, respectively.

The content processing terminal 300 may further include a received signal processor 365, a video signal processor 367, communication lines 361 and 363, a wired/wireless communicator 369, RAM 371, ROM 373, and a keyboard 375.

The received signal processor 365 may receive broadcast signals and multimedia content, and may convert the same into a format suitable for the audio output device 353 and the display device 351.

For example, the received signal processor 365 may select a broadcast channel corresponding to a command input by a user, and may demodulate or decode a signal received through the selected channel.

The received signal processor 365 may acquire an audio signal, an image signal, and a video signal from a received signal.

In this case, the audio signal may be transmitted to the audio signal processor 310 via the communication line 363, the image signal may be transmitted to the display processor 340 or the GUI processor 330 via the communication line 363, and the video signal may be transmitted to the video signal processor 367 via the communication line 363.

In addition, the received signal processor 365, the video signal processor 367, the audio signal processor 310, the GUI processor 330, and the display processor 340 may send and receive data to and from the controller 320 via the communication line 363, and may be controlled by the controller 320.

In addition, the wired/wireless communicator 369, the RAM 371, the ROM 373, and the keyboard 375 may send and receive data to and from the controller 320 via the communication line 361, and may be controlled by the controller 320.

The wired/wireless communicator 369 may receive a signal input by a user from a remote controller 380.

The wired/wireless communicator 369 may include a photosensor for receiving a signal from the remote controller 380, a communication module for Bluetooth communication, a wired communication module connected to a local area network (LAN) device.

The keyboard 375 may be used as the input means of the content processing terminal 300, and a volume control signal may also be input through the keyboard 375.

In addition, in the case wherein the content processing terminal 300 is a computer, the content processing terminal 300 may further include a mouse, although not shown in FIG. 3, and a volume control signal may also be input through the mouse.

FIGS. 4 to 11 are block diagrams for explaining the configuration of an audio signal processor according to one embodiment.

Figure 4:
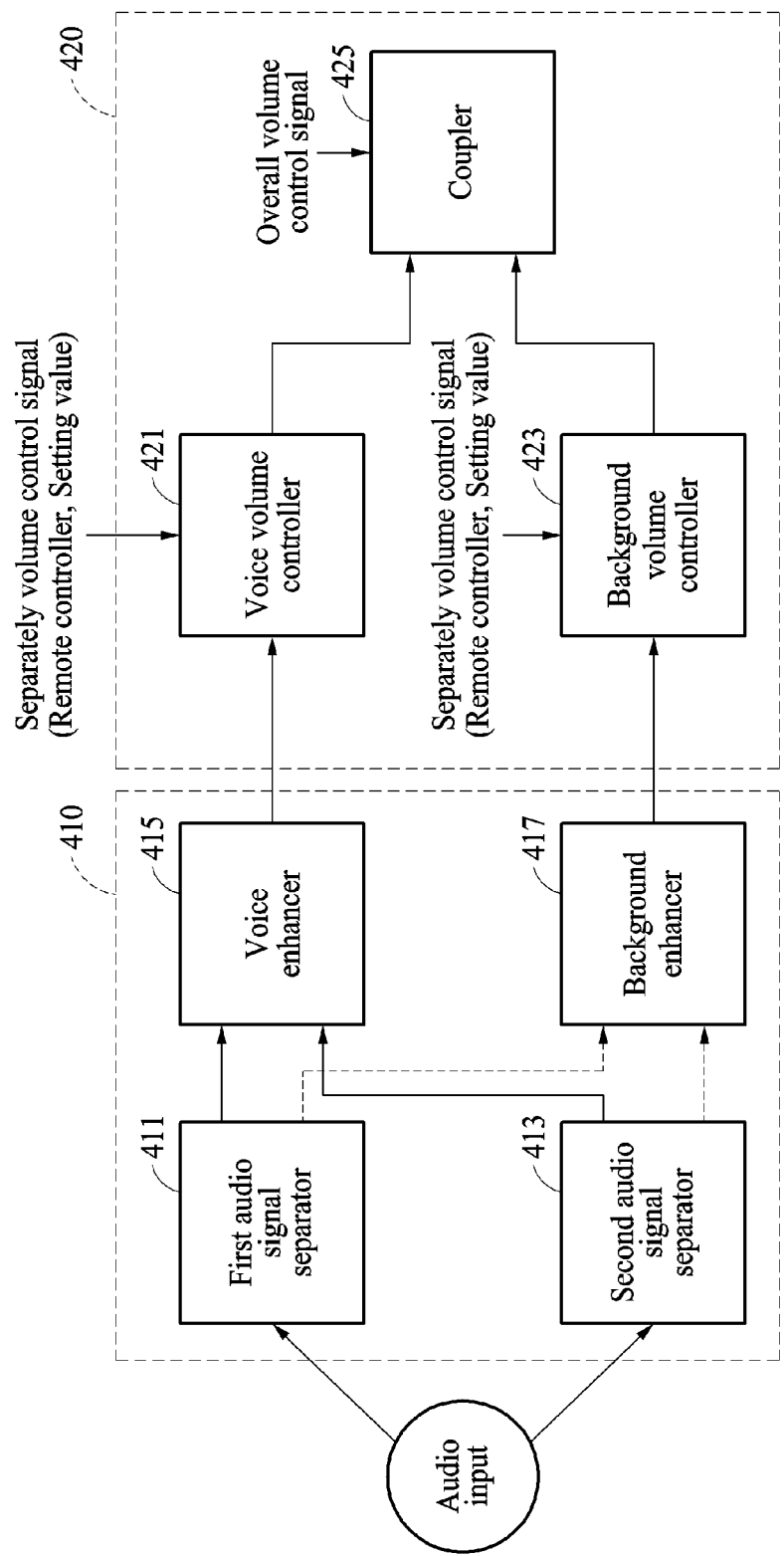
FIGS. 4 to 11 are block diagrams for explaining the configuration of an audio signal processor according to one embodiment.

Referring to FIG. 4, the audio signal processor may include an audio separator 410 and a volume controller 420.

The audio separator 410 may generate a voice source and a background source from an audio source.

The audio separator 410 may include a first audio signal separator 411, a second audio signal separator 413, a voice enhancer 415, and a background enhancer 417.

The first audio signal separator 411 may separate an audio source into a first voice signal and a first background signal.

The second audio signal separator 413 may separate an audio source into a second voice signal and a second background signal.

The voice enhancer 415 may generate enhanced voice sources based on the signal features of each of the first and second voice signals.

The background enhancer 417 may generate enhanced background sources based on the signal features of each of the first and second background signals.

The audio signals may be understood through features included in a low-level acoustic feature layer, an intermediate-level audio signature layer that allows different signal objects to be distinguished, and a high-level semantic model layer that allows different classes to be distinguished.

According to the high-level semantic model, the type of content may be classified using audio signals included in the multimedia content. However, in the present specification, information about the type or attributes of multimedia content may be explicitly provided as metadata or program guide information in a content provision server.

For example, a signal received by the received signal processor 365 of FIG. 3 may include various additional information about multimedia content, and the attributes or type of the content may be confirmed through the additional information.

For example, depending on the attributes of content, content may be classified into content in which a voice source is important, such as a drama, or content in which both a voice source and a background source (for example, field sound) are important, such as a sports program.

The features of an intermediate-level audio signature layer may be used to classify an audio signal into various sources. For example, using the features of an audio signature layer, an audio signal in a sports program may be classified into a background sound effect, a cheering sound, a bouncing sound, and the like.

That is, the features of an intermediate-level audio signature layer may be determined through analysis of low-level acoustic features.

The low-level acoustic features may be determined through the energy, pitch period, bandwidth, and main frequency component of an audio signal.

The low-level acoustic features may be classified into time domain features and frequency domain features.

The voice enhancer 415 may use the low-level acoustic features to generate an enhanced voice source that is closer to a voice signal.

The background enhancer 417 may also use the low-level acoustic features to generate an enhanced background source that is closer to a background signal.

For example, the voice enhancer 415 may compare the zero crossing rates (ZCRs) of the first and second voice signals with each other, and may select a ZCR having a stronger voice signal feature when the ZCRs of the first and second voice signals are different.

More specifically, a voice signal may have a higher ZCR than a background signal. Therefore, when the ZCRs of first and second voice signals are different in a specific frame, the voice enhancer 415 may select a signal with a higher ZCR as an enhanced voice source in the frame.

In addition, a high zero-crossing rate ratio (HZCRR) is the time domain features of an audio signal, and is defined as the ratio of the number of frames having a ZCR than 1.5 times the average ZCR in a window for one second.

In this case, a voice signal may have a higher HZCRR value than a background (for example, music) because the voice signal consists of voiced sounds and unvoiced sounds crossed in syllables.

Therefore, when the HZCRRs of the first and second voice signals are different in a specific frame, the voice enhancer 415 may select a signal with a higher HZCRR as an enhanced voice source in the frame.

As a similar example, when the HZCRRs of the first and second background signals are different in a specific frame, the background enhancer 417 may select a signal with a lower HZCRR as an enhanced background source in the frame.

In FIG. 12, examples of selecting an enhanced source in the time domain are shown. An example of selecting an average value of time domain features (FIG. 12 (a)), an example of selecting a high value of time domain features (FIG. 12 (b)), and an example of selecting a low value of time domain features (FIG. 12 (c)) are shown.

The frequency domain features of an audio signal may also be useful for separating the audio signal.

For example, the Mel-frequency cepstrum coefficient (MFCC) is an extracted frequency domain feature based on human auditory modeling.

Therefore, the voice enhancer 415 may compare the MFCCs of the first and second voice signals with each other, and may select the MFCC having a stronger voice signal feature when the MFCCs of the first and second voice signals are different.

In addition to MFCC, total power spectrum, subband power, center frequency, bandwidth, pitch frequency, and the like may be used as frequency domain features.

As described above, the voice enhancer 415 may compare the feature values of the first and second voice signals by unit time or unit frequency, may identify the differences between the feature values by the unit time or the unit frequency, and may determine the feature values of enhanced voice sources in consideration of the characteristics of the voice signals.

Similarly, the voice enhancer 415 may compare the feature values of the first and second background signals by unit time or unit frequency, may identify the differences between the feature values by the unit time or the unit frequency, and may determine the feature value of an enhanced voice source in consideration of the characteristics of the background signal.

The volume controller 420 may include a configuration for separately or independently controlling the volume levels of a voice source, a background source, and an entire source that combines the voice source and the background source.

The volume controller 420 may include a voice volume controller 421, a background volume controller 423, and a coupler 425.

The voice volume controller 421 may adjust the volume level of an enhanced voice source output from the voice enhancer 415 based on the volume control signal for a voice source.

The background volume controller 423 may adjust the volume level of an enhanced background source output from the background enhancer 417 based on the volume control signal for a background source.

The coupler 425 may adjust an overall volume level based on an overall volume control signal.

In this case, volume control signals input to the voice volume controller 421, the background volume controller 423, and the coupler 425, respectively, may be transmitted from the remote controller 380 through the controller 320, or may be setting values transmitted from the controller 320.

Figure 5:
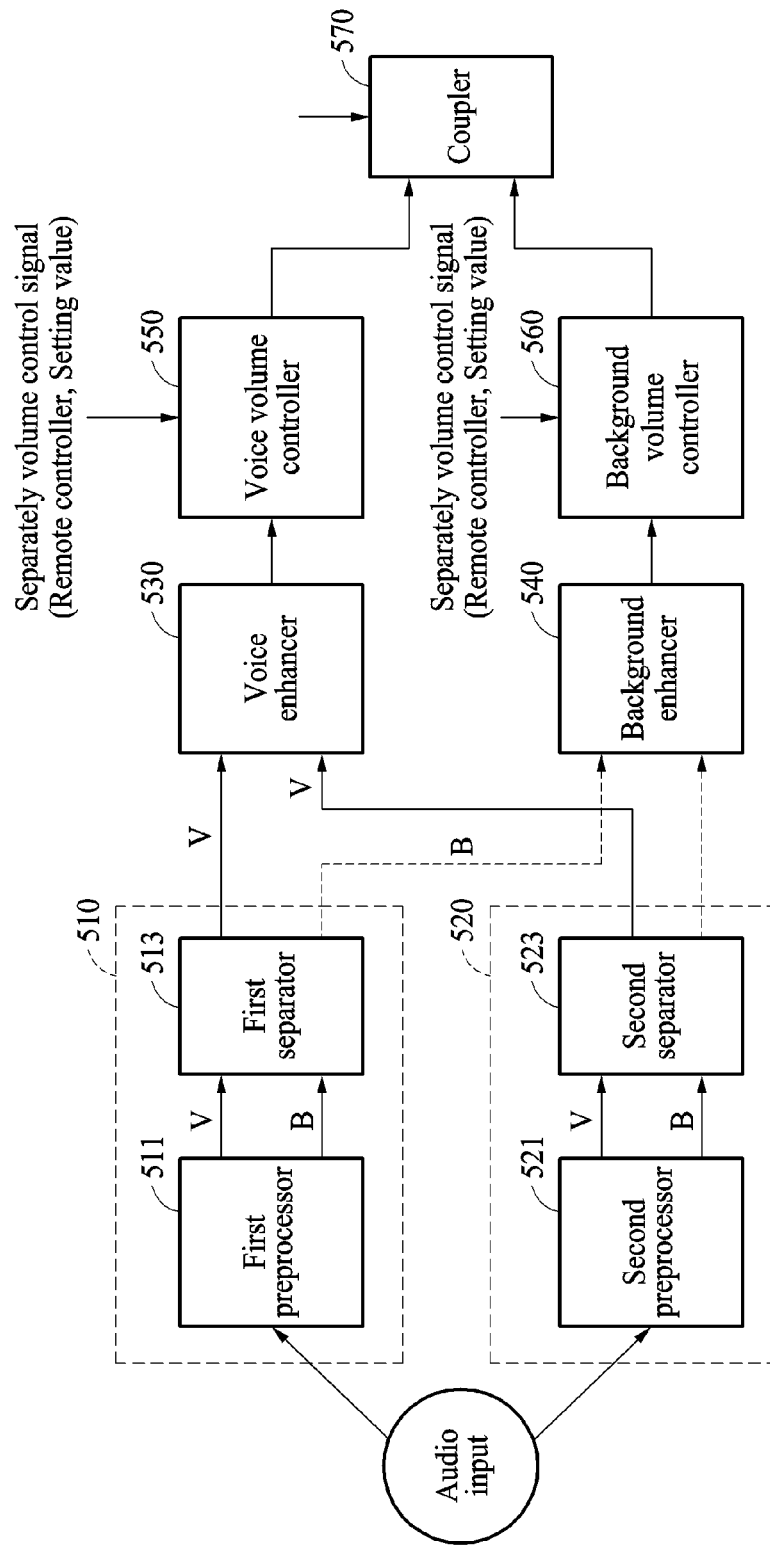

FIG. 5 shows the configuration of an audio signal processor according to another embodiment.

The configuration of the audio signal processor shown in FIG. 5 is similar to that of the audio signal processor shown in FIG. 4, except that the configuration of first and second audio signal separators 510 and 520 is shown in more detail.

Referring to FIG. 5, the first audio signal separator 510 may include a first preprocessor 511 and a first separator 513.

The first preprocessor 511 may preprocess an audio source, and may classify the audio source into a first voice segment and a first background segment using a first audio separation algorithm.

The first separator 513 may output the first voice signal and the first background signal by applying a probabilistic latent component analysis (PLCA)-based audio separation algorithm to the first voice segment and the first background segment.

The second audio signal separator 520 may include a second preprocessor 521 and a second separator 523.

The second preprocessor 521 may preprocess an audio source, and may classify the audio source into a second voice segment and a second background segment using a second audio separation algorithm different from the first audio separation algorithm.

The second separator 523 may output the second voice signal and the second background signal by applying a probabilistic latent component analysis-based audio separation algorithm to the second voice segment and the second background segment.

In this case, the first audio separation algorithm may be a support vector machine (SVM)-based audio separation algorithm, and the second audio separation algorithm may be a Gaussian mixture model (GMM)-based audio separation algorithm.

The SVM-based audio separation algorithm may be superior to the GMM-based audio separation algorithm in terms of separation of voice signals, and the GMM-based audio separation algorithm may be superior to the SVM-based audio separation algorithm in terms of separation of background signals.

In the present specification, a procedure in which the SVM-based audio separation algorithm is used and then the PLCA-based audio separation algorithm is used may be referred to as a voice enhancement procedure. In addition, a procedure in which the GMM-based audio separation algorithm is used and then the PLCA-based audio separation algorithm is used may be referred to as a voice enhancement procedure.

A voice enhancer 530, a background enhancer 540, a voice volume controller 550, a background volume controller 560, and a coupler 570 shown in FIG. 5 may perform the same functions as the voice enhancer 415, the background enhancer 417, the voice volume controller 421, the background volume controller 423, and the coupler 425 shown in FIG. 4, respectively.

In addition, due to a difference in application algorithms, a difference in processing time between a procedure for generating a voice source or an enhanced voice source and a procedure for generating a background source or an enhanced background source may occur.

In addition, when performing the process of generating a voice source and a background source more clearly, it may take more time than when audio separation is not performed.

Therefore, a configuration considering audio signal separation time may be required.

Figure 6:
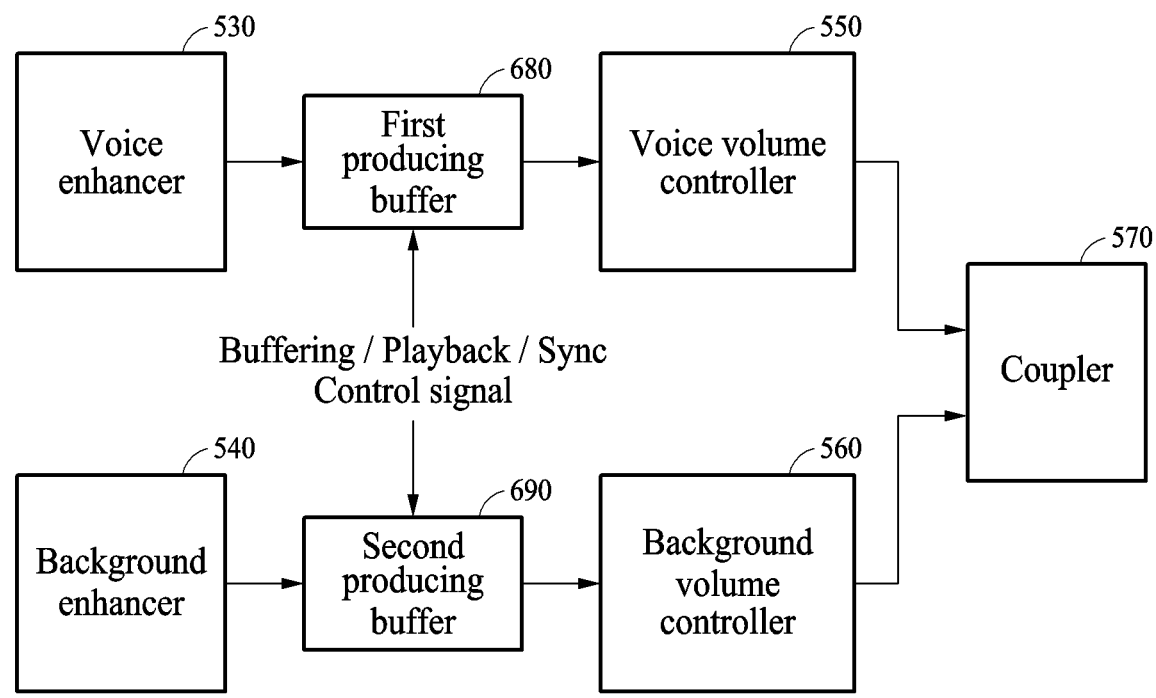

FIG. 6 shows an example of using a buffer device in consideration of time required for audio signal separation.

Referring to FIG. 6, the audio signal processor may further include first and second production buffers 680 and 690 in addition to the components shown in FIG. 5.

The first production buffer 680 may perform buffering of a voice source, and the second production buffer 690 may perform buffering of a background source.

For example, the controllers 220 and 320 shown in FIG. 2 or 3 may transmit a control signal for controlling at least one of the buffering time and synchronization of the voice source and the background source to the first and second production buffers 680 and 690.

Here, the buffering time may be expressed as frame units stored in a buffer, and may be determined in consideration of the processing time of a voice source and a background source.

For example, when various algorithms are applied to improve the performance of separating an audio source, several tens of frames may be allocated to the buffering time, and when an audio source is separated with moderate audio separation performance, the buffering time may be determined to be 10 frames or less.

In addition, buffering may be performed when the audio source of content begins to be input. When a volume adjustment event does not occur during a period of time (for example, 50% of buffering time), some or all of the previously buffered signals may be erased.

In addition, when there is a difference between a processing time during which a voice source is generated and stored in the first production buffer 680 and a processing time during which a background source is generated and stored in the second production buffer 690, synchronization may be performed according to a signal for controlling synchronization.

For example, it may be assumed that the time at which a voice source starts to be stored in the first production buffer 680 is T1 and the time at which a background source starts to be stored in the second production buffer 690 is T1+t.

In this case, synchronization may simply indicate output of the buffered signal from time T1 in the case of the voice source and output of the buffered signal from time T1+t in the case of the background source.

In addition, the audio signal must be synchronized with the video signal and has strong real-time properties. Therefore, the type of audio separation algorithm or audio separation procedure may be selected so that the entire audio processing procedure is performed within video signal processing time.

Figure 7:
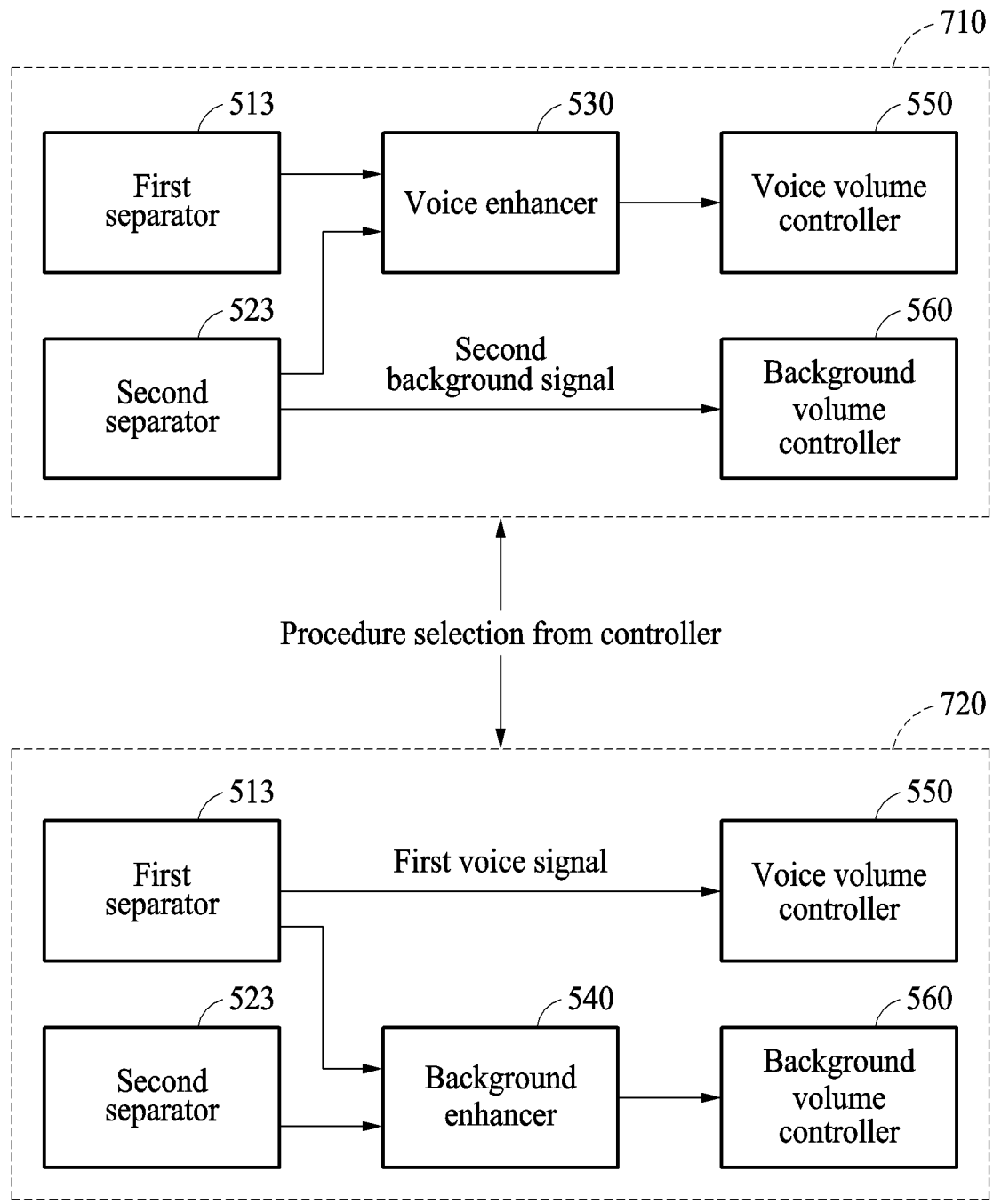

FIG. 7 shows an example of components used in a voice enhancement procedure and components used in a background enhancement procedure in the configuration of the audio signal processor shown in FIG. 5.

Referring to FIG. 7, when a voice enhancement procedure 710 is selected, the first separator 513, the second separator 523, the voice enhancer 530, the voice volume controller 550, and the background volume controller 560 may operate.

Therefore, in the voice enhancement procedure 710, an enhanced voice source and a background source may be input to the voice volume controller 550 and the background volume controller 560, respectively. In this case, since the second background signal is a signal output to the background volume controller 560, the second background signal may be referred to as a 'background source'.

Referring to FIG. 7, when a background enhancement procedure 720 is selected, the first separator 513, the second separator 523, the background enhancer 540, the voice volume controller 550, and the background volume controller 560 may operate.

Therefore, in the background enhancement procedure 720, a voice source and an enhanced background source may be input to the voice volume controller 550 and the background volume controller 560, respectively. In this case, since the first voice signal is a signal output to the voice volume controller 550, the first voice signal may be referred to as a 'voice source'.

Figure 8:
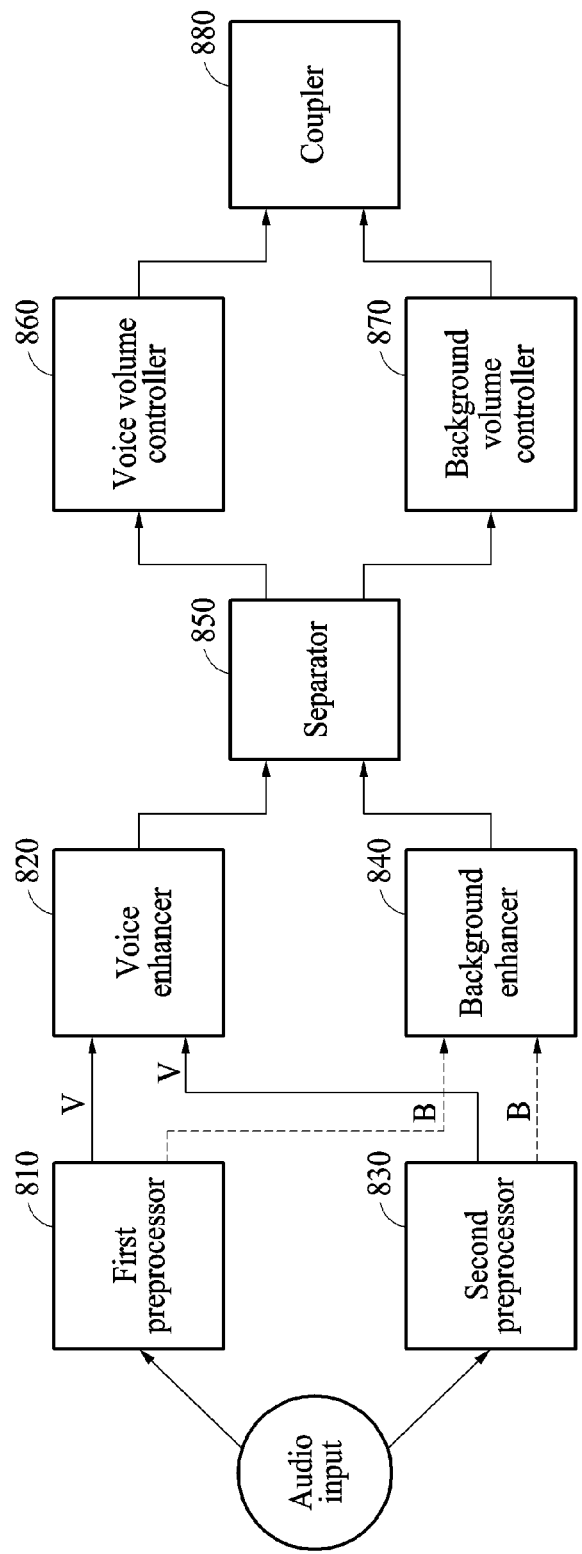

FIG. 8 shows the configuration of an audio signal processor according to another embodiment.

Referring to FIG. 8, the audio signal processor may include a first preprocessor 810, a voice enhancer 820, a second preprocessor 830, a background enhancer 840, a separator 850, a voice volume controller 860, a background volume controller 870, and a coupler 880.

Here, the voice volume controller 860, the background volume controller 870, and the coupler 880 may perform the same functions as the voice volume controller 550, the background volume controller 560, and the coupler 570 shown in FIG. 5, respectively.

The first preprocessor 810 may classify an audio source into a first voice segment and a first background segment using a first audio separation algorithm.

The second preprocessor 830 may classify the audio source into a second voice segment and a second background segment using a second audio separation algorithm different from the first audio separation algorithm.

In this case, the first audio separation algorithm may be a support vector machine (SVM)-based audio separation algorithm, and the second audio separation algorithm may be a Gaussian mixture model (GMM)-based audio separation algorithm.

The voice enhancer 820 may generate enhanced voice segments based on the signal features of each of the first and second voice segments.

Here, a method of generating enhanced voice segments is similar to a method of generating enhanced voice sources.

For example, the voice enhancer 820 may compare the feature values of the first and second voice segments by unit time or unit frequency, may identify the differences between the feature values by the unit time or the unit frequency, and may generate enhanced voice segments in consideration of the characteristics of the voice signal.

The background enhancer 840 may generate enhanced background segments based on the signal features of each of the first and second background signals.

Here, a method of generating enhanced background segments is similar to a method of generating enhanced background sources.

For example, the background enhancer 840 may compare the feature values of the first and second background segments by unit time or unit frequency, may identify the differences between the feature values by the unit time or the unit frequency, and may generate enhanced background segments in consideration of the characteristics of the background signal.

The separator 850 may output an enhanced voice source and an enhanced background source by applying a probabilistic latent component analysis-based audio separation algorithm to the enhanced voice segment and the enhanced background segment.

Unlike the example shown in FIG. 5, in the example shown in FIG. 8, a probabilistic latent component analysis-based audio separation algorithm is performed once. Accordingly, in the case of FIG. 8, computational load may be smaller than that of FIG. 5.

In addition, in the example shown in FIG. 8, a buffer that performs buffering may also be included.

Figure 9:
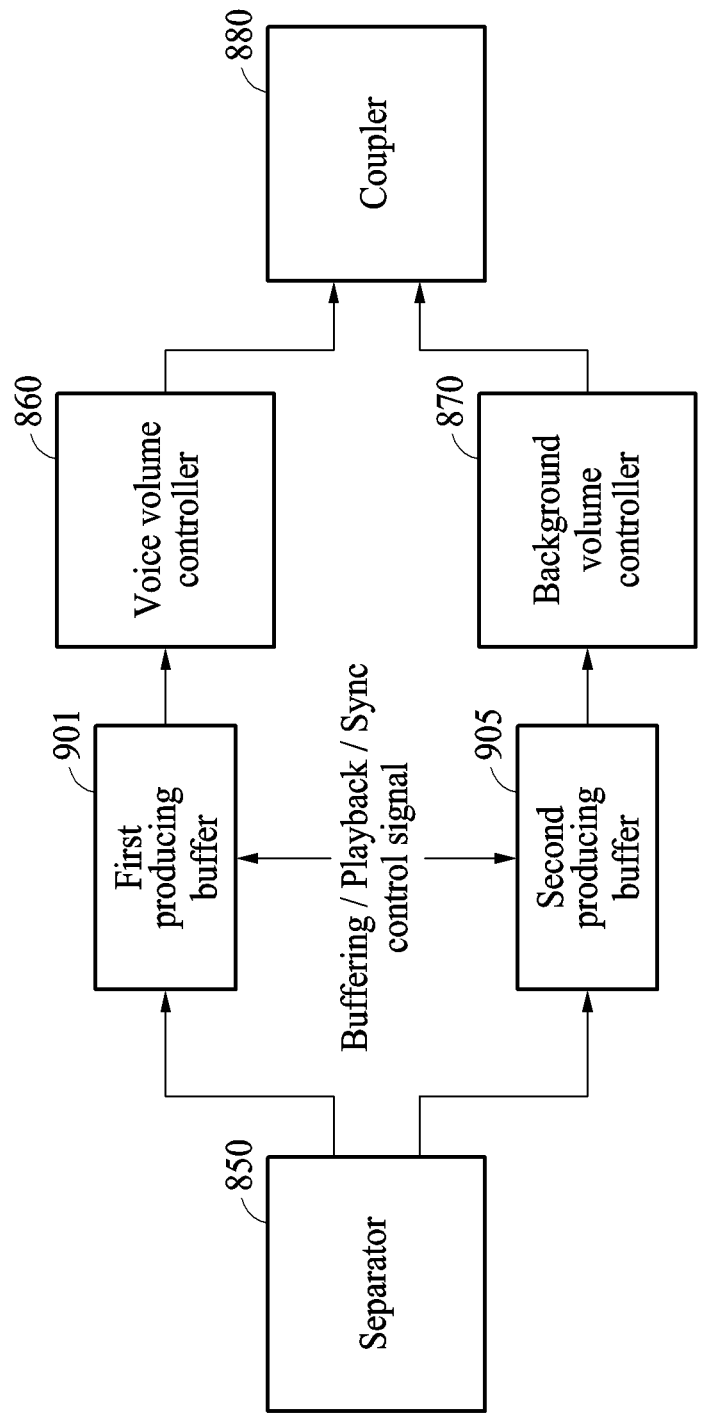

Referring to FIG. 9, an enhanced voice source and an enhanced background source output from the separator 850 may be buffered in first and second production buffers 901 and 905, respectively.

Figure 10:
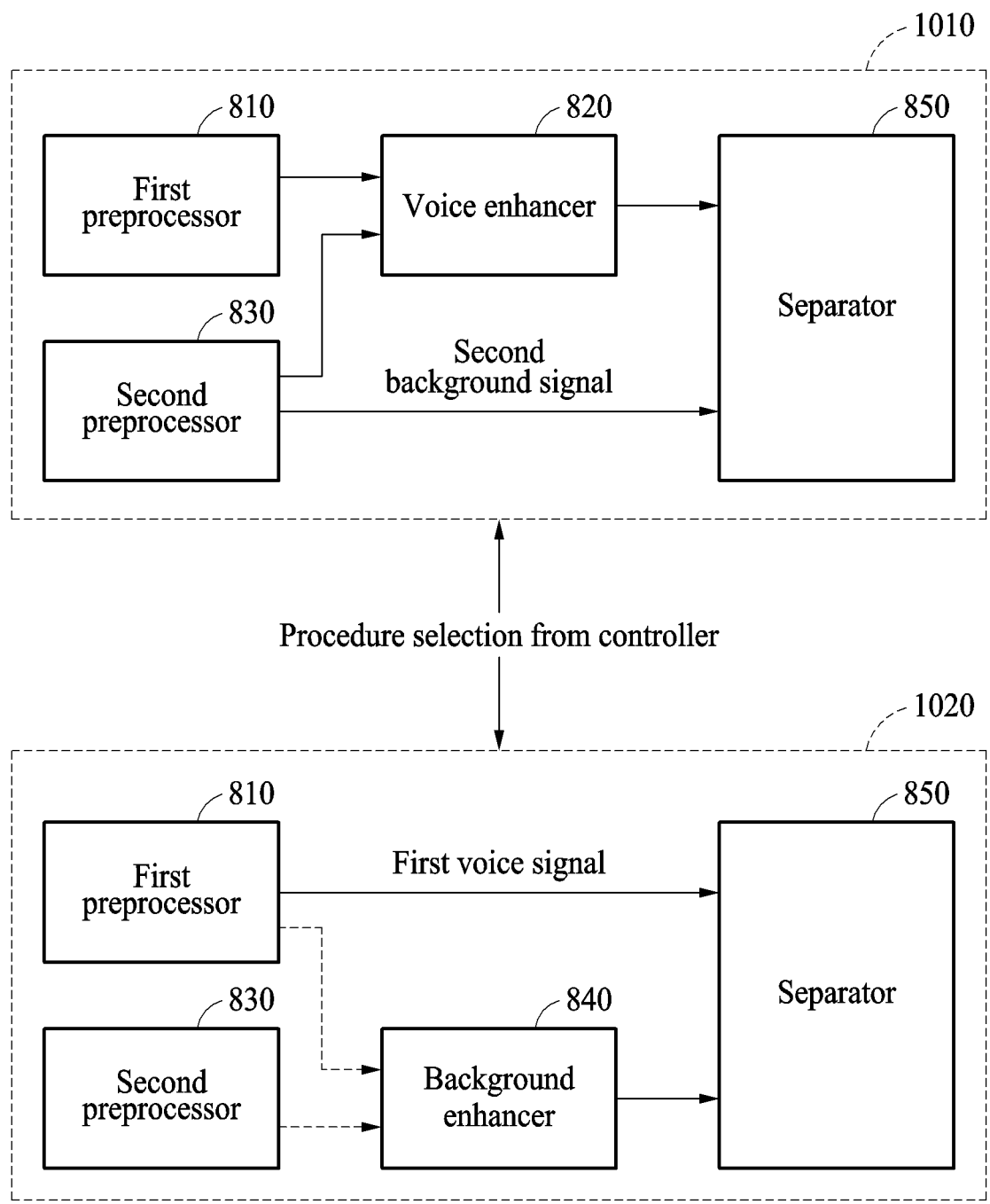

FIG. 10 shows an example of components used in a voice enhancement procedure and components used in a background enhancement procedure in the configuration of the audio signal processor shown in FIG. 8.

Referring to FIG. 10, when a voice enhancement procedure 1010 is selected, the first preprocessor 810, the second preprocessor 830, the voice enhancer 820, and the separator 850 may operate.

Therefore, in the voice enhancement procedure 1010, an enhanced voice source and a background source may be input to the voice volume controller 860 and the background volume controller 870, respectively.

In this case, the second background signal input to the separator 850 may be referred to as a second background segment.

Referring to FIG. 10, when a background enhancement procedure 1020 is selected, the first preprocessor 810, the second preprocessor 830, the background enhancer 840, and the separator 850 may operate.

Therefore, in the background enhancement procedure 1020, a voice source and an enhanced background source may be input to the voice volume controller 860 and the background volume controller 870, respectively.

In this case, the first voice signal input to the separator 850 may be referred to as a first voice segment.

Figure 11:
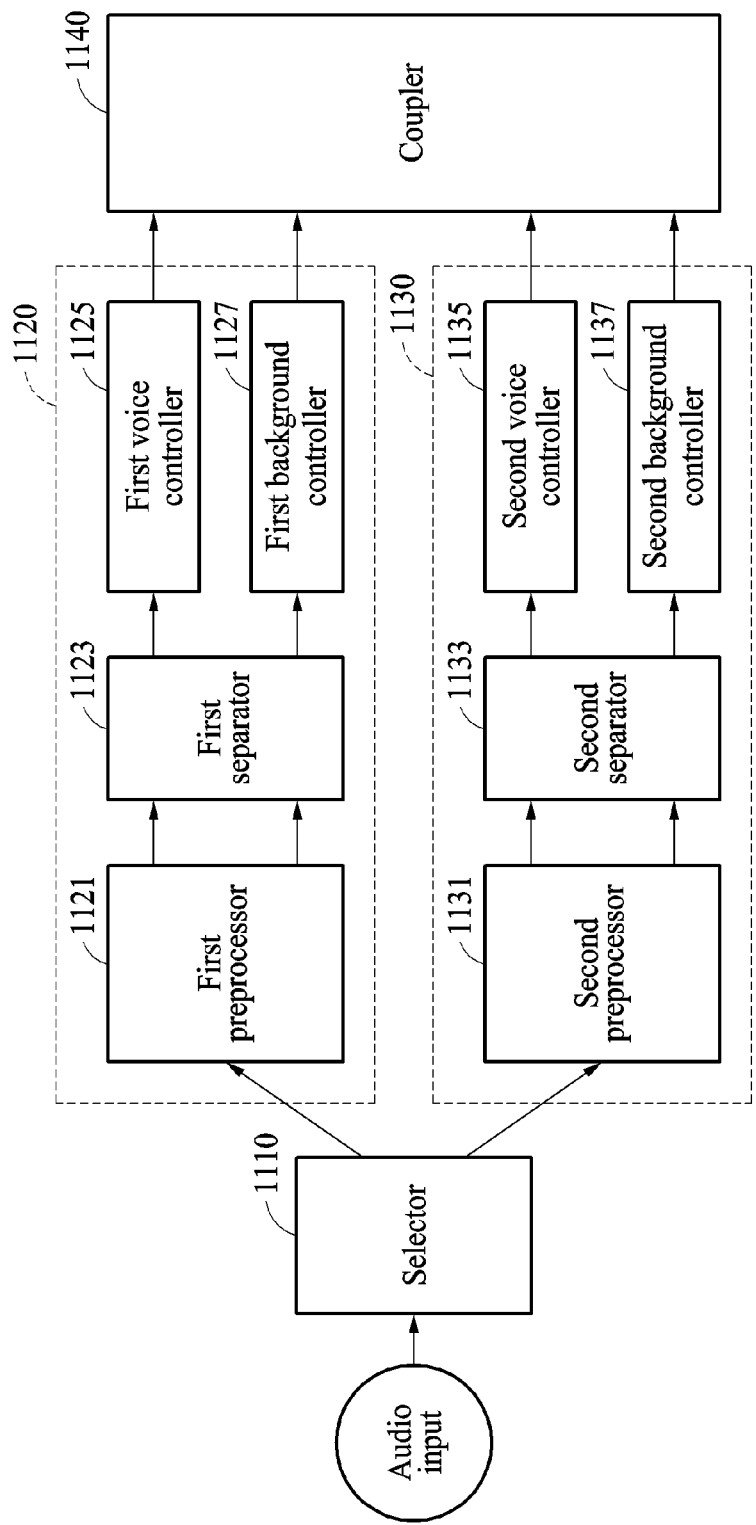

FIG. 11 shows the configuration of an audio signal processor according to another embodiment.

Referring to FIG. 11, the audio signal processor may include a selector 1110, a voice enhancement audio source part 1120, a background enhancement audio source part 1130, and a coupler 1140.

The selector 1110 may select a voice enhancement procedure or a background enhancement procedure according to the type of multimedia content or user setting.

In this case, selection of a voice enhancement procedure or a background enhancement procedure may be controlled by the controller 220 or 320 shown in FIG. 2 or 3.

For example, when the audio source of multimedia content is input, the controller 320 may determine whether a value set for each type of multimedia content or user preference information is stored by checking a user profile.

In this case, a value set for each type of multimedia content or user preference information is present, the voice enhancement procedure or the background enhancement procedure may be selected according to the set value.

In this case, the value set for each type of content may be applied to a process of independently adjusting the volume levels of a voice source and a volume source in addition to the example shown in FIG. 11.

In this case, when the value set for each type of multimedia content or user preference information is absent, a procedure may be selected according to the properties of multimedia content.

For content with strong voice attribute, such as dramas, news, speeches, and press conferences, the voice enhancement procedure may be selected. In addition, for content with strong background attribute, such as music broadcast and sports, the background enhancement procedure may be selected.

In the voice enhancement audio source part 1120, the voice enhancement procedure may be activated. The voice enhancement audio source part 1120 may output a sound in which the voice source is enhanced among the voice source and the background source.

In the background enhancement audio source part 1130, the background enhancement procedure may be activated. The background enhancement audio source part 1130 may output a sound in which the background source is enhanced among the voice source and the background source.

The voice enhancement audio source part 1120 may include a first preprocessor 1121, a first separator 1123, a first voice controller 1125, and a first background controller 1127.

In this case, the first preprocessor 1121 may perform a SVM-based audio separation algorithm, and the first separator 1123 may perform a PLCA-based audio separation algorithm.

The background enhancement audio source part 1130 may include a second preprocessor 1131, a second separator 1133, a second voice controller 1135, and a second background controller 1137.

In this case, the second preprocessor 1131 may perform a GMM-based audio separation algorithm, and the second separator 1133 may perform a PLCA-based audio separation algorithm.

The coupler 1140 may output an audio signal that combines the voice source and the background source.

Figure 12A:
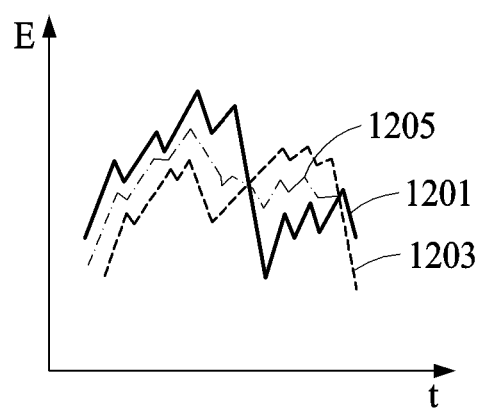
FIGS. 12A to 12C are graphs for explaining voice source enhancement or background source enhancement according to one embodiment.
Figure 12B:
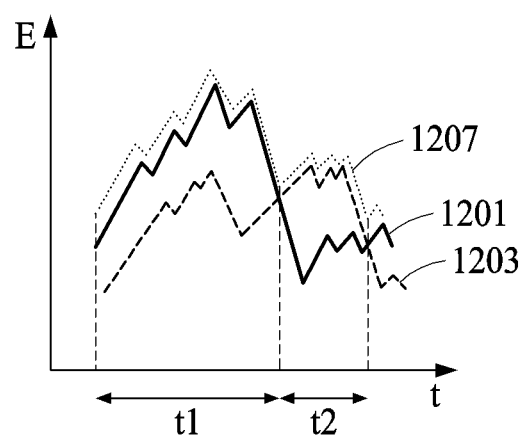
Figure 12C:
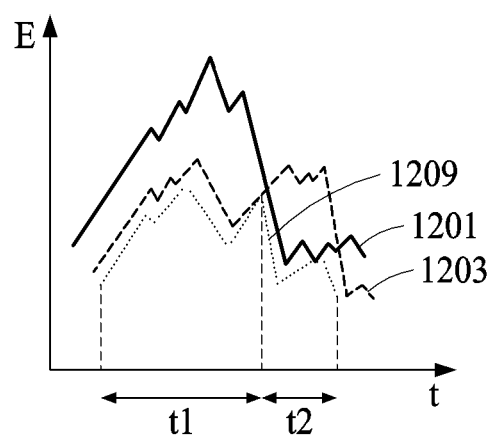

FIGS. 12A to 12C are graphs for explaining voice source enhancement or background source enhancement according to one embodiment.

In FIGS. 12A to 12C, t represents time, and E represents energy (for example, voltage).

In FIGS. 12A to 12C, reference numeral 1201 may be a first voice signal or a first background signal. In FIGS. 12A to 12C, reference numeral 1203 may be a second voice signal or a second background signal.

Referring to FIG. 12A, reference numeral 1205 denotes an average value of reference numerals 1201 and 1203, and represents an enhanced voice source or an enhanced background source.

Referring to FIG. 12B, reference numeral 1207 denotes a high value among reference numerals 1201 and 1203, and represents an enhanced voice source or an enhanced background source.

For example, in time interval t1, a first voice signal corresponding to reference numeral 1201 is selected, and in time interval t2, a second voice signal corresponding to reference numeral 1203 is selected.

Referring to FIG. 12C, reference numeral 1209 denotes a low value among reference numerals 1201 and 1203, and represents an enhanced voice source or an enhanced background source.

For example, in time interval t1, a signal corresponding to reference numeral 1203 is selected, and in time interval t2, a signal corresponding to reference numeral 1201 is selected.

Figure 13:
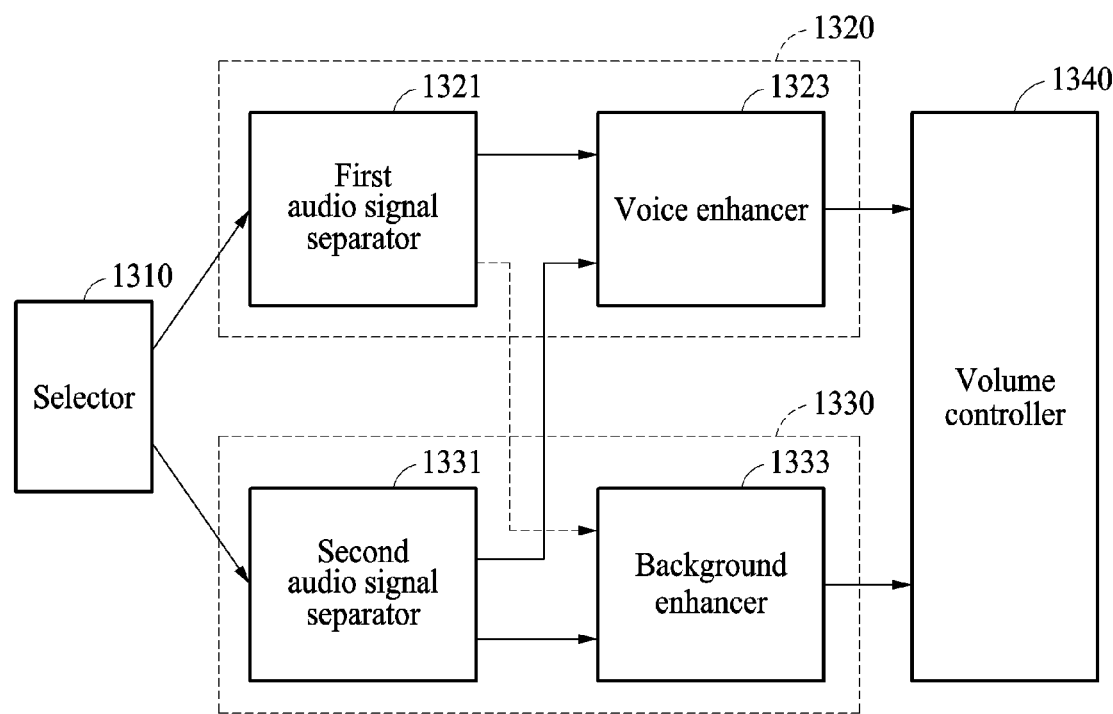
FIG. 13 is a block diagram for explaining the configuration of an audio signal processor according to another embodiment.

FIG. 13 is a block diagram for explaining the configuration of an audio signal processor according to another embodiment.

Referring to FIG. 13, the audio signal processor may include a selector 1310, a voice enhancement audio source part 1320, a background enhancement audio source part 1330, and a volume controller 1340.

The selector 1310 may select the voice enhancement procedure or the background enhancement procedure according to the type of multimedia content or user setting.

In this case, the selector 1310 may perform the function of the selector 1110 shown in FIG. 11. Therefore, selection of the voice enhancement procedure or the background enhancement procedure may be controlled by the controller 220 or 320 shown in FIG. 2 or 3.

In the voice enhancement audio source part 1320, 'a first audio separation function of separating the audio source of multimedia content into a first voice signal and a first background signal using a first audio separation algorithm' and 'a voice enhancement function of generating an enhanced voice source' may be activated in the voice enhancement procedure.

In the background enhancement audio source part 1330, 'a second audio separation function of separating the audio source of multimedia content into a second voice signal and a second background signal using a second audio separation algorithm' and 'a background enhancement function of generating an enhanced background source' may be activated in the background enhancement procedure.

In the voice enhancement audio source part 1320, the voice enhancement function may be deactivated in the background enhancement procedure. In the background enhancement audio source part 1330, the background enhancement function may be deactivated in the voice enhancement procedure.

The voice enhancement function may serve to generate enhanced voice sources based on the signal features of each of the first and second voice signals.

The background enhancement function may serve to generate enhanced background sources based on the signal features of each of the first and second background signals.

The voice enhancement audio source part 1320 may include a first audio signal separator 1321 and a voice enhancer 1323, and the background enhancement audio source part 1330 may include a second audio signal separator 1331 and a background enhancer 1333.

The first audio signal separator 1321 may perform the same function as the first audio signal separator 411 shown in FIG. 4 or the first audio signal separator 510 shown in FIG. 5.

The voice enhancer 1323 may perform the same function as the voice enhancer 415 shown in FIG. 4 or the voice enhancer 530 shown in FIG. 5.

The second audio signal separator 1331 may perform the same function as the second audio signal separator 413 shown in FIG. 4 or the second audio signal separator 520 shown in FIG. 5.

The background enhancer 1333 may perform the same function as the background enhancer 417 shown in FIG. 4 or the background enhancer 540 shown in FIG. 5.

The volume controller 1340 may separate the volume level of the enhanced voice source and the volume level of the enhanced background source based on a volume control signal.

The volume controller 1340 may perform the same function as the volume controller 420 shown in FIG. 4.

Figure 14:
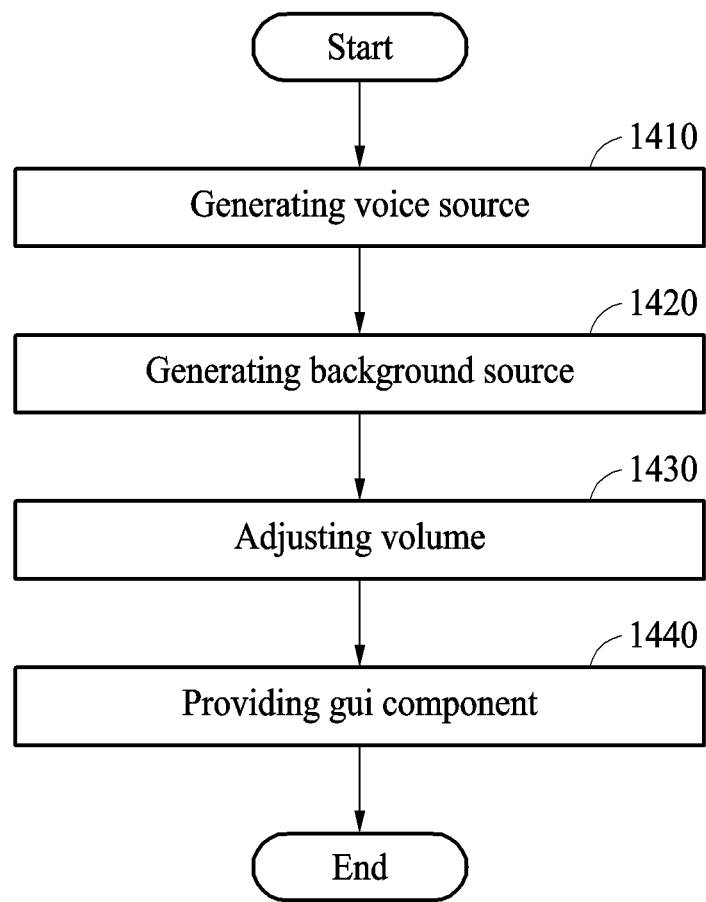
FIG. 14 is a flowchart for explaining a method of providing the audio environment of a content processing terminal according to one embodiment.

FIG. 14 is a flowchart for explaining a method of providing the audio environment of a content processing terminal according to one embodiment.

The method shown in FIG. 14 may be performed by a content processing terminal according to one embodiment.

Referring to FIG. 14, in step 1410, a content processing terminal may separate the audio source of multimedia content into a first voice signal and a first background signal using a first audio separation procedure, may separate the audio source into a second voice signal and a second background signal using a second audio separation procedure, and may process at least one of the first and second voice signals to generate a voice source.

In this case, the first and second audio separation procedures may be performed by a combination of various components shown in FIGS. 4 to 11 and FIG. 13.

For example, the first audio separation procedure may be performed by the first audio signal separator 411 shown in FIG. 4 or the first audio signal separator 510 shown in FIG. 5.

In step 1420, the content processing terminal may process at least one of the first and second background signals to generate a background source.

In step 1430, the content processing terminal may adjust at least one of the voice source and the background source according to a volume control signal.

In step 1440, the content processing terminal may identify a graphical user interface (GUI) component corresponding to the volume control signal, may process the GUI component, and may provide the processed GUI component to a display device.

Figure 15A:
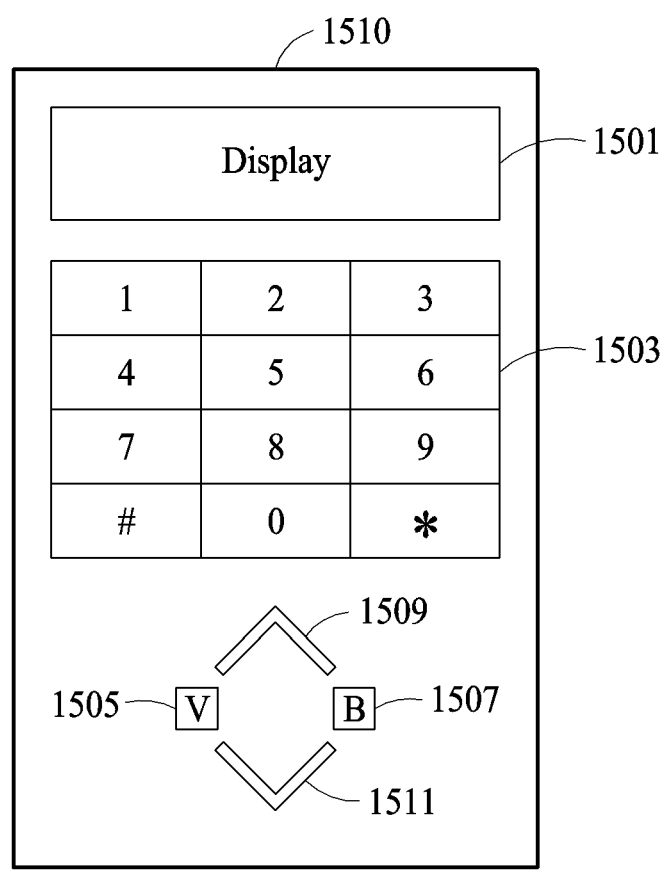
FIGS. 15A and 15B include drawings for explaining the configuration of an audio volume adjustment device according to one embodiment.
Figure 15B:
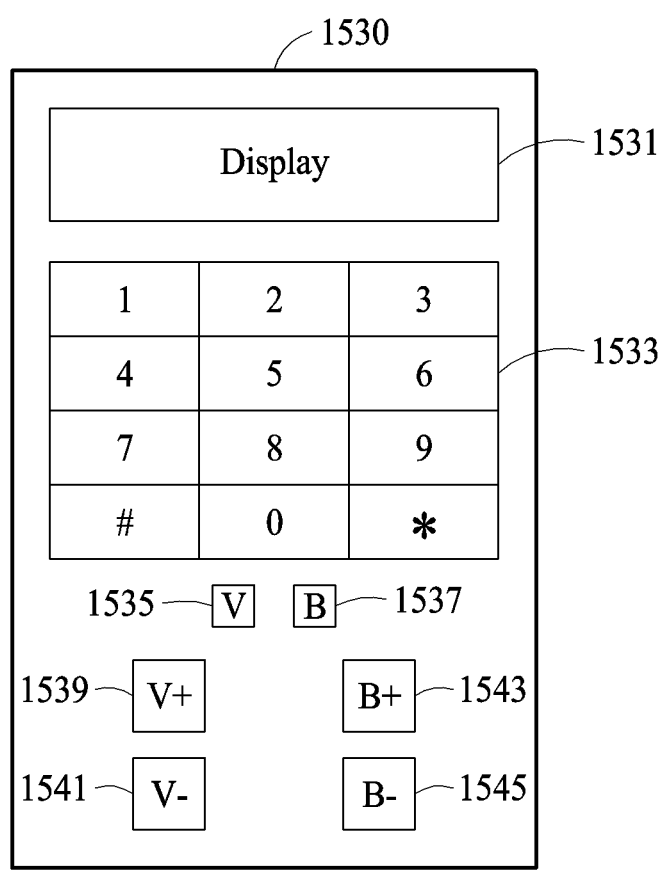

FIGS. 15A and 15B include drawings for explaining the configuration of an audio volume adjustment device according to one embodiment.

The audio volume adjustment device shown in FIGS. 15A and 15B may be the remote controller 380 shown in FIG. 3.

FIGS. 15A and 15B show examples of the configuration of the audio volume adjustment device.

Each of an audio volume adjustment device 1 1510 and an audio volume adjustment device 2 1530 may provide a voice adjustment interface that adjusts the volume level of the voice source of multimedia content being displayed on a content processing terminal independently of the volume level of the background source of multimedia content.

In addition, each of the audio volume adjustment device 1 1510 and the audio volume adjustment device 2 1530 may provide a volume adjustment interface that adjusts the volume level of the background source of multimedia content independently of the volume level of the voice source.

The audio volume adjustment device 1 1510 and the audio volume adjustment device 2 1530 may further include displays 1501 and 1531, respectively, that indicate current volume levels and currently enhanced audio sources.

In the current volume levels, the volume levels of a voice source, a background source, and an entire source may be separately displayed.

Each of the audio volume adjustment device 1 1510 and the audio volume adjustment device 2 1530 may include a communicator (not shown) for transmitting a volume control signal to the content processing terminal.

Each of the audio volume adjustment device 1 1510 and the audio volume adjustment device 2 1530 may transmit a volume control signal to the content processing terminal when the volume control signal is input through a volume adjustment button.

Referring to the audio volume adjustment device 1 1510, volume adjustment buttons 1505, 1507, 1509, and 1511 capable of independent volume control of voice and background may be included.

When a voice selection key 1505 is selected and a volume up key 1509 is selected, the content processing terminal may increase the volume level of a voice source.

When a background selection key 1507 is selected and a volume down key 1511 is selected, the content processing terminal may reduce the volume level of a background source.

In this case, when input signals of number keys 1503 and 1533 are received from the remote controller within a predetermined time after receiving a volume control signal, the controller of the content processing terminal may control the audio signal processor to adjust at least one of the voice source and the background source at a volume level corresponding to the input signals of number keys.

For example, when a user presses the voice selection key 1505 and then inputs '20' using number keys 1503, the volume of a voice source at the content processing terminal may be adjusted to a level corresponding to '20'. In this case, on the display device, the volume adjustment bar may not be displayed, and only the text of the number 20 may be displayed.

In the case of the audio volume adjustment device 1 1510, a user may select the volume up key 1509 or the volume down key 1511 without pressing the voice selection key 1505 or the background selection key 1507.

In this case, when the voice selection key 1505 or the background selection key 1507 is not selected and the volume up key 1509 is selected, an entire audio volume may be adjusted.

Referring to the audio volume adjustment device 2 1530, a voice volume up key 1539, a voice volume down key 1541, a background volume up key 1543, and a background volume down key 1545 may be included.

A user may independently adjust the volumes of a voice source and a background source without selecting voice or background using the voice volume up key 1539, the voice volume down key 1541, the background volume up key 1543, and the background volume down key 1545.

In the audio volume adjustment device 2 1530, a voice selection key 1535 may be used to select a voice enhancement mode, and a background selection key 1537 may be used to select a background enhancement mode. For example, when the voice selection key 1535 is selected, the voice enhancement procedure 1010 shown in FIG. 10 or the voice enhancement audio source part 1120 shown in FIG. 11 may operate.

In addition, in the audio volume adjustment device 2 1530, when the voice selection key 1535 is selected, a volume control signal that reduces the volume level of a background source and increases the volume level of a voice source to a predetermined level may be generated.

In addition, in the audio volume adjustment device 2 1530, when numbers are input through number keys 1533 within a predetermined time during which the voice selection key 1535 or the background selection key 1537 is selected, a volume control signal that adjusts the audio source to a voice level corresponding to the numbers may be generated.

Figure 16:
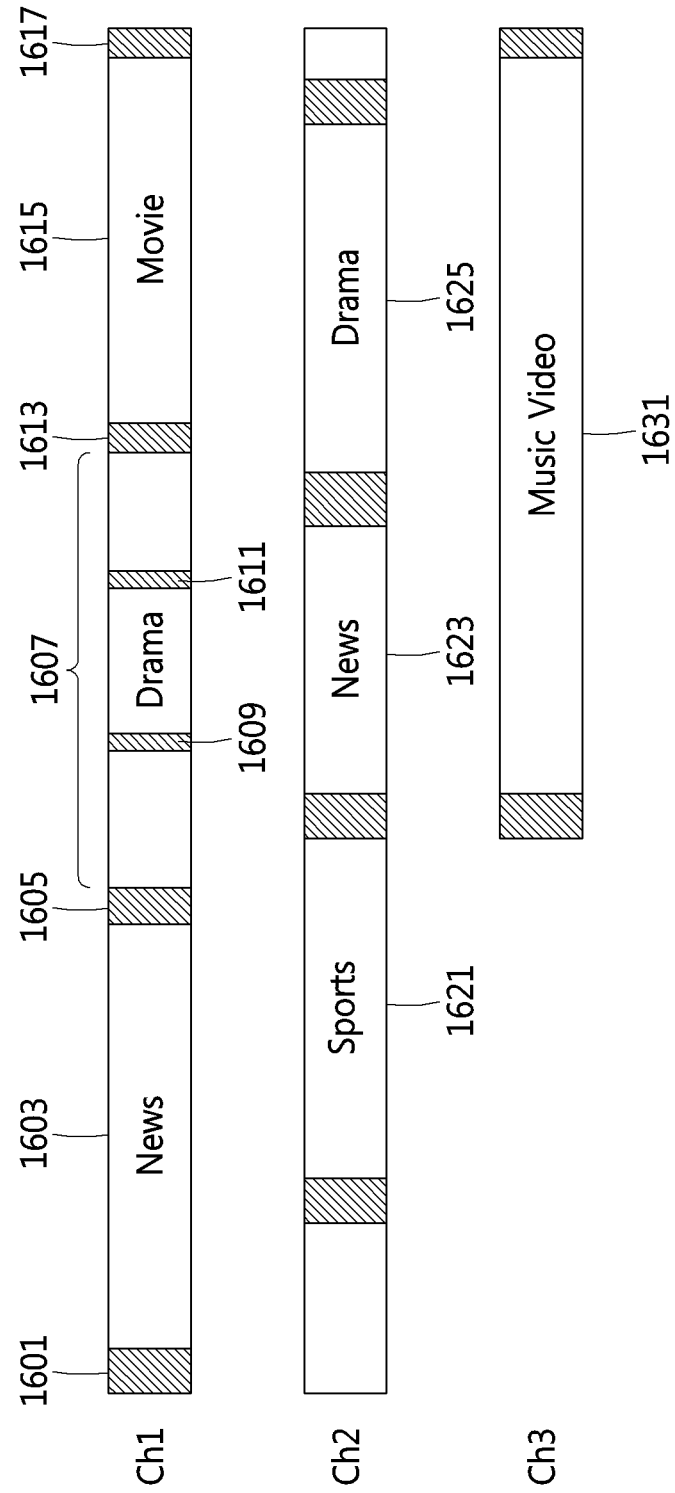
FIG. 16 includes drawings for explaining examples of program information provided by a content processing terminal according to one embodiment.

FIG. 16 includes drawings for explaining examples of program information provided by a content processing terminal according to one embodiment.

Referring to FIG. 16, the received signal processor 365 of FIG. 3 may receive the channel-specific program guide information shown in FIG. 16.

In FIG. 16, channel 1 (Ch1) may be the program information of a channel selected by a current user.

The program information of channel 1 may include a plurality of advertisement content 1601, 1605, 1613, and 1617. In FIG. 16, reference numerals 1609 and 1611 may represent advertisements viewed during content playback. In this case, in the case of advertisements viewed during content playback, background volumes may be silent depending on user setting.

When currently broadcast content is news 1603, and independent adjustment of a voice volume and a background volume is performed while the news 1603 is being broadcast, the controller 320 of FIG. 3 may store information about the volume adjustment.

When the same volume adjustment state lasts for more than a predetermined time, the controller 320 may generate information about the user's preferred volume level settings for the content 'news'.

For example, it is assumed that the state of 'voice volume 12/background volume 04' during the watching of the news 1603 lasted for 20 minutes, the state of 'voice volume 10/background volume 10' during the playback of the news 1603 lasted for 5 minutes, and the state of 'voice volume 15/background volume 5' lasted for 20 minutes.

In this case, the controller 320 may set the 'voice volume 12/background volume 04' selected at the beginning of the content as the user's preferred volume level for news content, or may set the 'voice volume 15/background volume 5' selected at the latter stage of content playback as the user's preferred volume level for news content.

In addition, the controller 320 may set the volume setting maintained for the longest time during playback of the same content as the user's preferred volume level for the content, or may set an average value as the user's preferred volume level.

For example, the controller 320 may set 'voice volume 13.5/background volume 4.5' corresponding to an average value of the 'voice volume 12/background volume 04' and the 'voice volume 15/background volume 5' as the user's preferred volume level for news content.

In addition, the controller 320 may set the total average value of the voice volume and the background volume as the user's preferred volume level for the corresponding content.

In the example shown in FIG. 16, when a user changes to channel 2 (Ch2) to watch news 1623 while watching a drama 1607 on channel 1, the controller 320 may adjust the current volume level to the user's preferred volume level for news content.

As described above, the controller 320 may store the volume control information selected by a user for each type or attributes of multimedia content, and may generate information about the user's preferred volume level settings for multimedia content of identical types or attributes based on the stored volume control information.

In addition, the controller 320 may transmit the information about the user's preferred volume level settings to a server providing the multimedia content, or may share the information with an external terminal connected to the content processing terminal.

In this case, the information about the user's preferred volume level settings transmitted to the server may be used as user preference information when the user consumes the same kind of content in a separate terminal (for example, a mobile terminal).

Referring again to FIG. 16, the same volume level may be applied when the user watches the drama 1607 of channel 1 and then watches the drama 1625 on channel 2. When a user watches the drama 1607 of channel 1 and then watches a music video 1631 of channel 3 (Ch3), the controller 320 may adjust the current volume level to a value suitable for the music video content.

For example, when the music video 1631 of channel 3 is selected while the drama 1607 of channel 1 is being displayed in the state of 'voice volume 10/background volume 2', the controller may adjust the volume level to the state of 'voice volume 10/background volume 10'.

Similarly, when sports 1621 of channel 3 is selected while the news 1603 of channel 1 is being displayed, the controller 320 may control the audio signal processor 310 to adjust the volume level suitable for the sports contents.

For each type or attributes of the multimedia content, the controller 320 may determine the volume level adjustment features of the voice source, the background source, and an entire audio source having the voice source and the background source combined, and may control the audio signal processor based on the volume level adjustment features.

For example, when the attributes of multimedia content is mainly voice signals, even when an entire mute button signal is received from the remote controller, the controller 320 may silence only the level of a voice source.

When the type or attributes of the multimedia content corresponds to voice enhancement, the controller 320 may control the volume level of the voice source independently of the volume level of the background source when adjusting the volume level of the entire audio source. In this case, the volume level adjustment unit of the voice source may be set to be smaller than the volume level adjustment unit of the background source.

For example, the controller 320 may sequentially receive entire volume reduction signals three times from the remote controller during playback of content such as the dramas 1607 and 1625 corresponding to voice enhancement. In this case, the controller 320 may adjust the first entire volume reduction to 'voice 14/background 8' when the current volume is 'voice 15/background 10', may adjust the second entire volume reduction to 'voice 13/background 6', and may adjust the third entire volume reduction to 'voice 12/background 4'. That is, in content having voice enhancement attributes, the voice volume reduction unit may be 1, and the background volume reduction unit may be 2. On the other hand, in content having voice enhancement attributes, the voice volume increase unit may be 2, and the background volume reduction unit may be 1.

Figure 17:
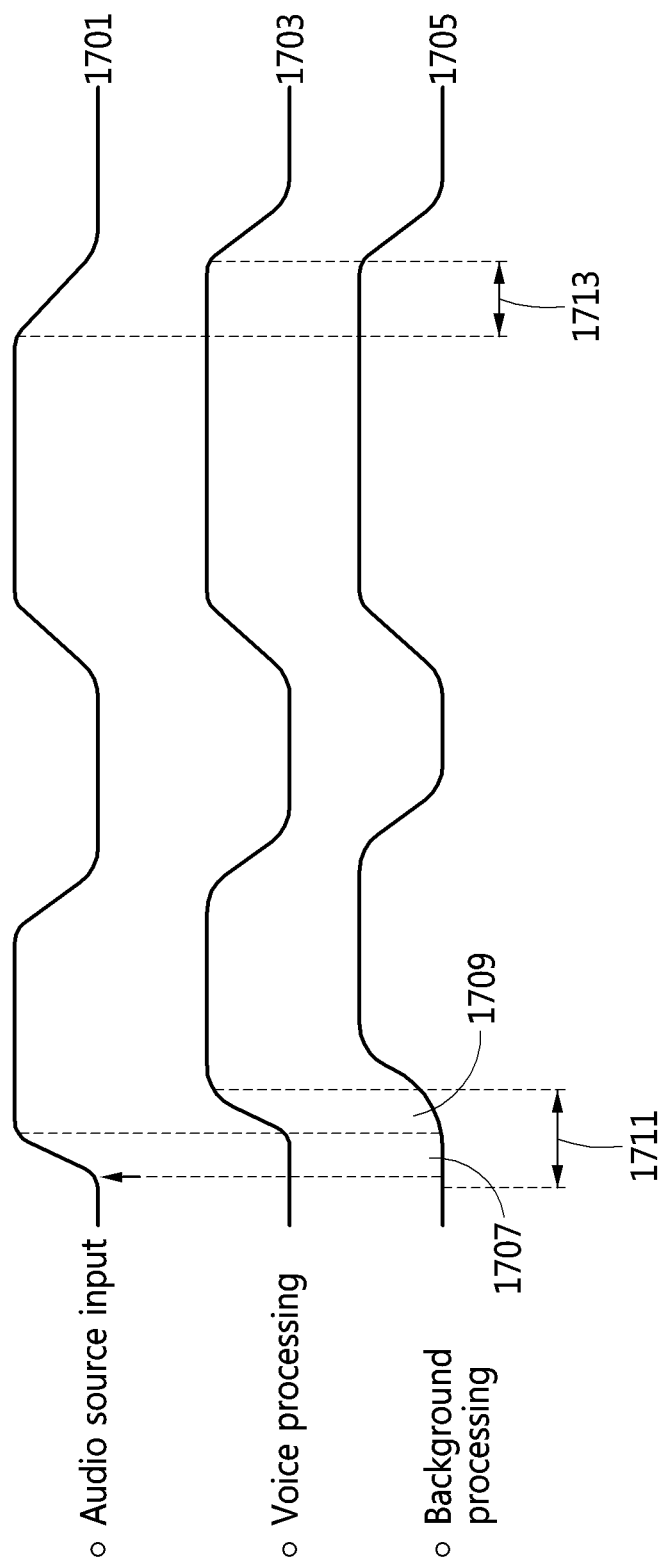
FIG. 17 includes drawings for explaining timing of audio signal processing performed in a content processing terminal according to one embodiment.

FIG. 17 includes drawings for explaining timing of audio signal processing performed in a content processing terminal according to one embodiment.

In FIG. 17, reference numeral 1701 denotes timing showing whether an audio source is input or not, reference numeral 1703 denotes timing at which a voice source is generated, and reference numeral 1705 denotes timing at which a background source is generated.

As shown in FIG. 17, it can be seen that a voice source audio signal is output after a period of time 1707 has passed since the voice source audio signal was input. That is, reference numeral 1707 denotes time required to process an audio signal to generate a voice source. In addition, reference numeral 1709 denotes a processing time difference between a voice source and a background source.

In FIG. 17, reference numerals 1707 and 1713 may be time of the first and second production buffers 680 and 690 of FIG. 6.

Although the example shown in FIG. 17 shows a case wherein the processing times for generating a voice source and a background source are different from each other, this difference may be a very short time such that the user does not feel inconvenienced.

FIGS. 18 to 24 are drawings for explaining methods of providing graphical user interfaces in a content processing terminal according to one embodiment.

Hereinafter, the examples shown in FIGS. 18 to 24 will be described with reference to operation of the GUI processors 230 and 330 of FIG. 2 or 3.

The GUI processor 230 may acquire the graphical object of a GUI component corresponding to the volume control signal according to the type or attributes of multimedia content, and may determine an arrangement position of the graphical object based on the type or attributes of the multimedia content.

In this case, the graphical object may include at least one of a voice volume adjustment object, a background volume adjustment object, and an entire volume adjustment object.

Figure 18:
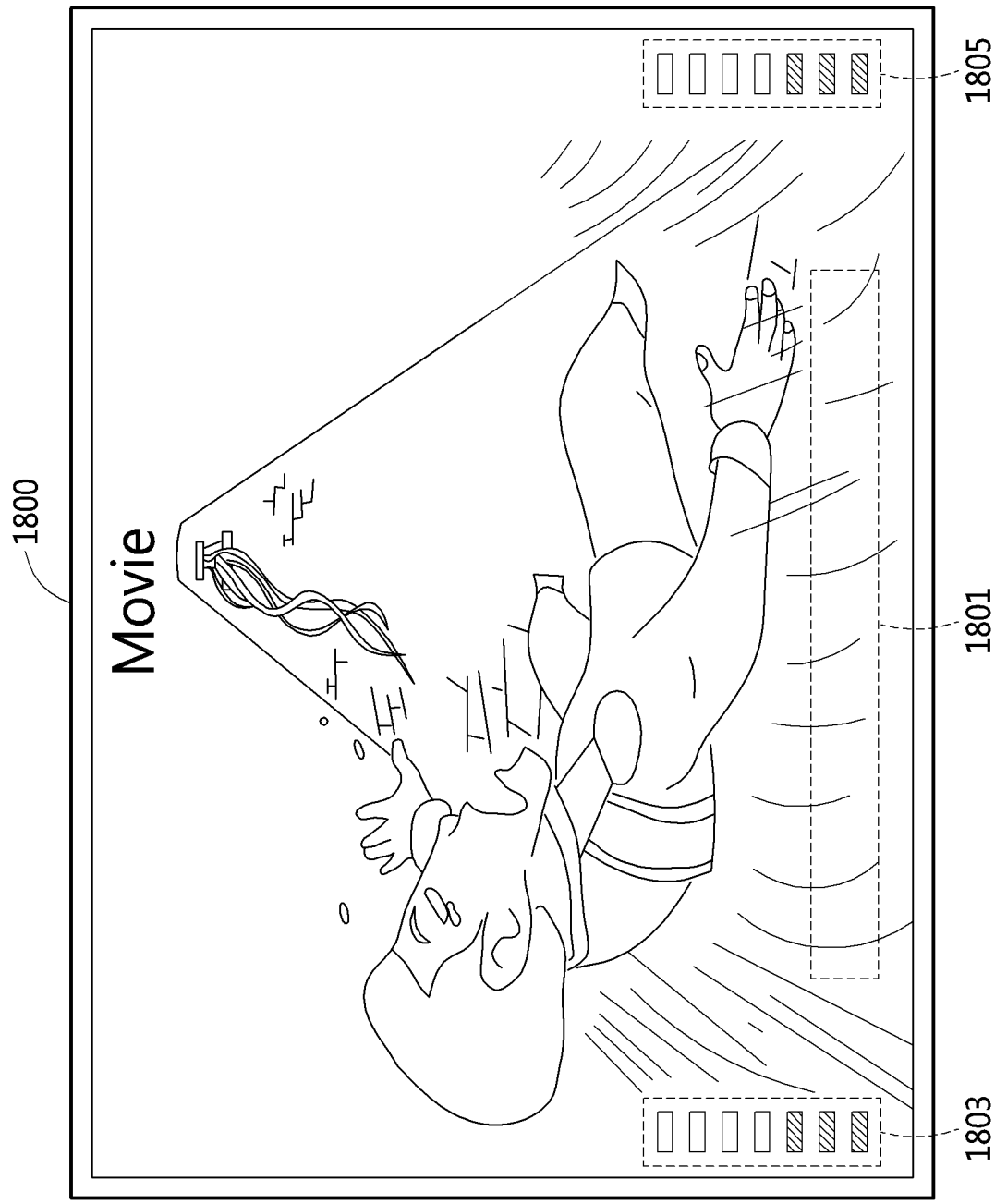
FIGS. 18 to 24 are drawings for explaining methods of providing graphical user interfaces in a content processing terminal according to one embodiment.

FIG. 18 shows an example of a movie playback screen 1800 on which a movie is being displayed.

The movie playback screen 1800 may include a subtitle area 1801 where subtitles are displayed. Therefore, the GUI processor 230 may determine that an area in which a volume adjustment graphical object is displayed is located at a position other than the subtitle area 1801.

In this case, in the case of the movie playback screen 1800, a voice volume adjustment object and a background volume adjustment object may be separately displayed on the left and right, respectively.

For example, the voice volume adjustment object may be displayed in a voice volume area 1803, and the background volume adjustment object or the entire volume adjustment object may be displayed in a background area 1805.

Figure 19:
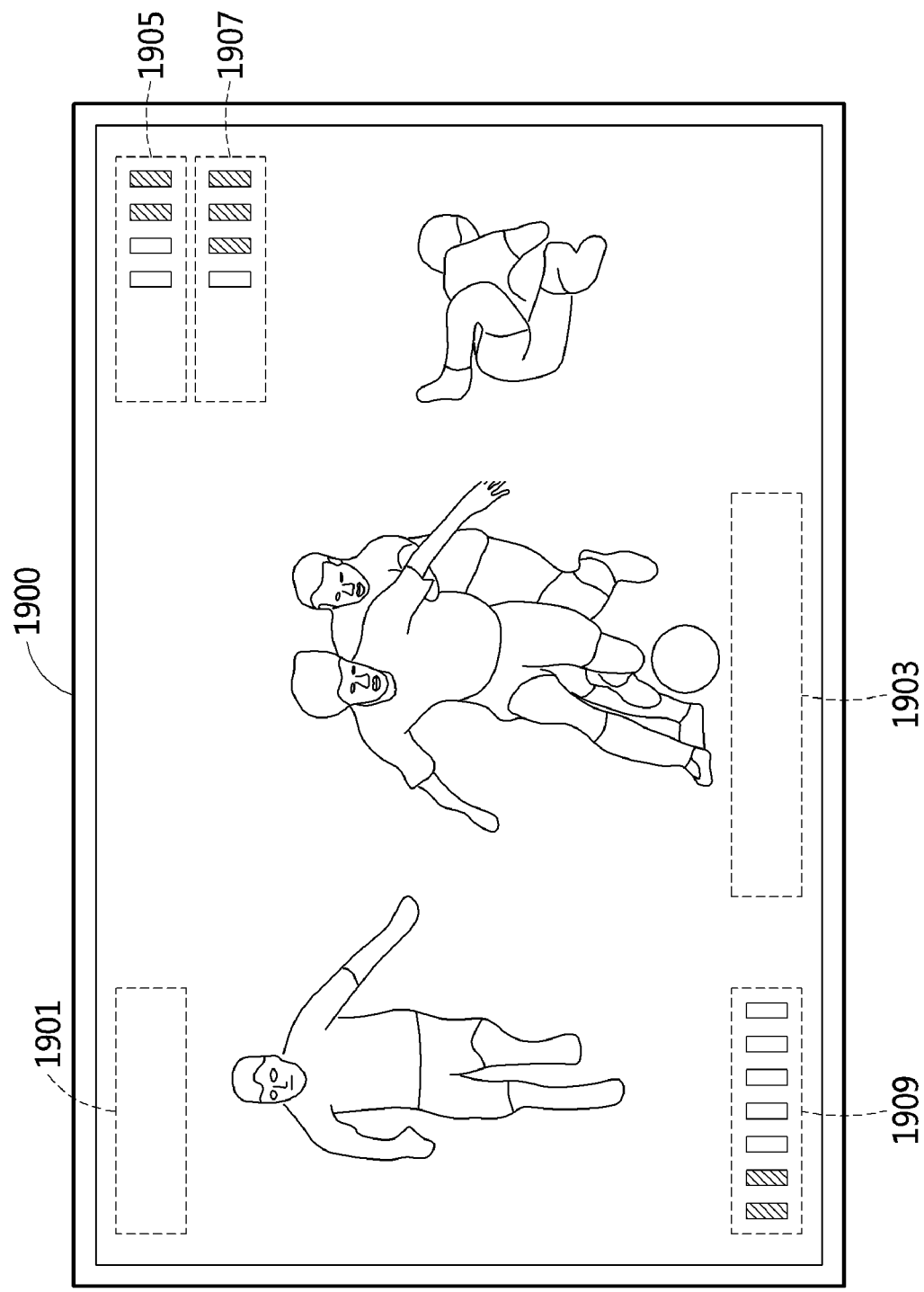

FIG. 19 shows an example of a sports playback screen 1900 on which a sport is being displayed.

When sports content is being displayed, the GUI processor 230 may determine the display positions of graphical objects in consideration of a score display area 1901, a player information display area 1903, and the like, which are typically included in the sports playback screen 1900.

For example, the voice volume adjustment object may be displayed in the upper right of a voice volume area 1905 of the sports playback screen 1900, and the background volume adjustment object may be displayed at lower 1907 of the voice volume area 1905.

In addition, the entire volume adjustment object may be displayed in a lower left end region 1909 of the sports playback screen 1900.

Figure 20:
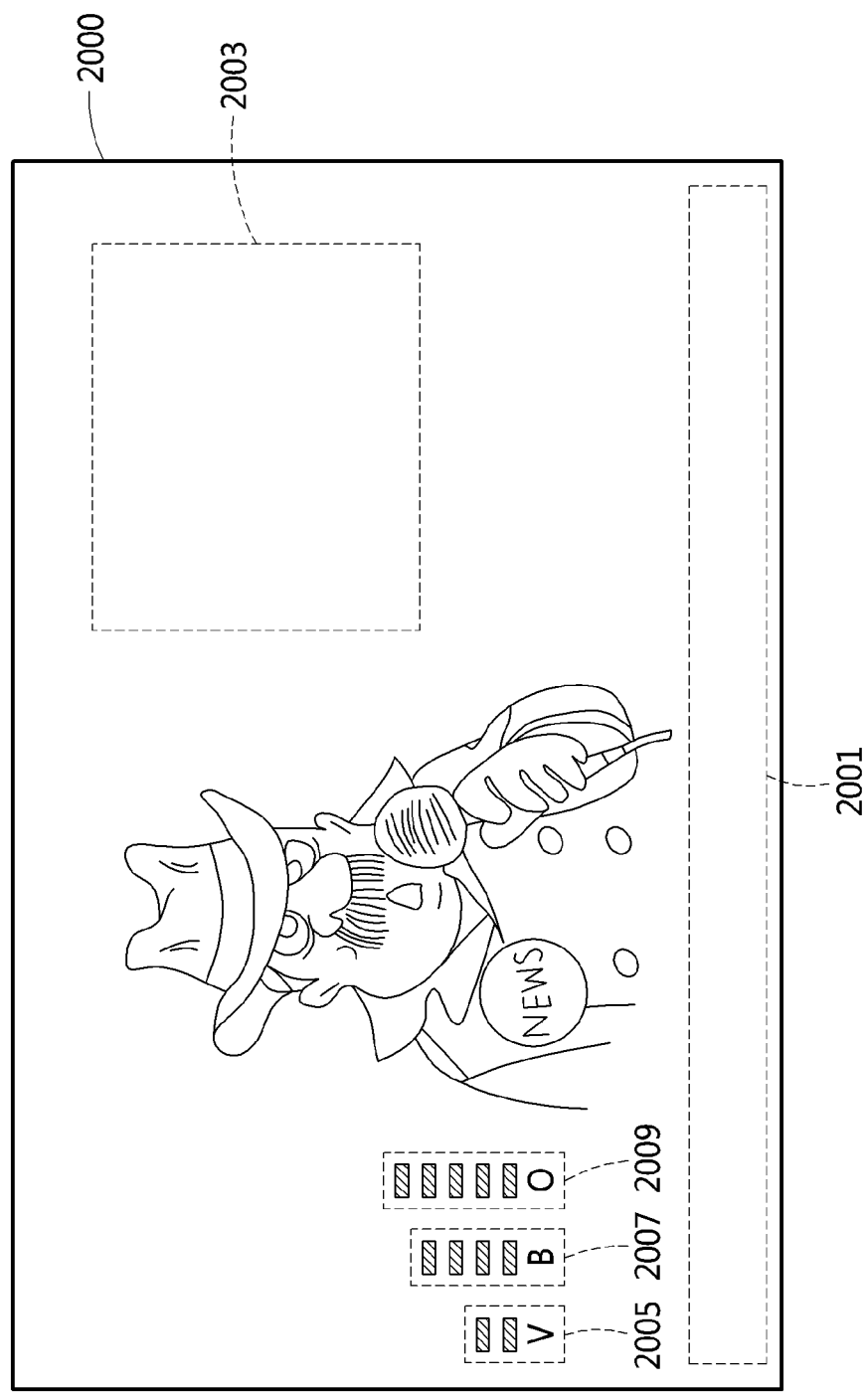

FIG. 20 shows an example of a news playback screen 2000 on which news is being displayed.

When the news content is being displayed, the GUI processor 230 may determine the display positions of graphical objects in consideration of a breaking and briefing area 2001 and a data screen area 2003, which may typically be included in the news playback screen 2000.

The GUI processor 230 may determine the positions of the graphical objects by avoiding the breaking and briefing area 2001 and the center of a screen (in general, the position of an announcer), and may perform resizing (reduction) of the graphical objects when necessary.

For example, in the news playback screen 2000, in the case of graphical objects for volume adjustment, a voice volume area 2005, a background volume area 2007, and an entire volume area 2009 may be displayed at the top of the breaking and briefing area 2001 in reduced sizes.

Figure 21:
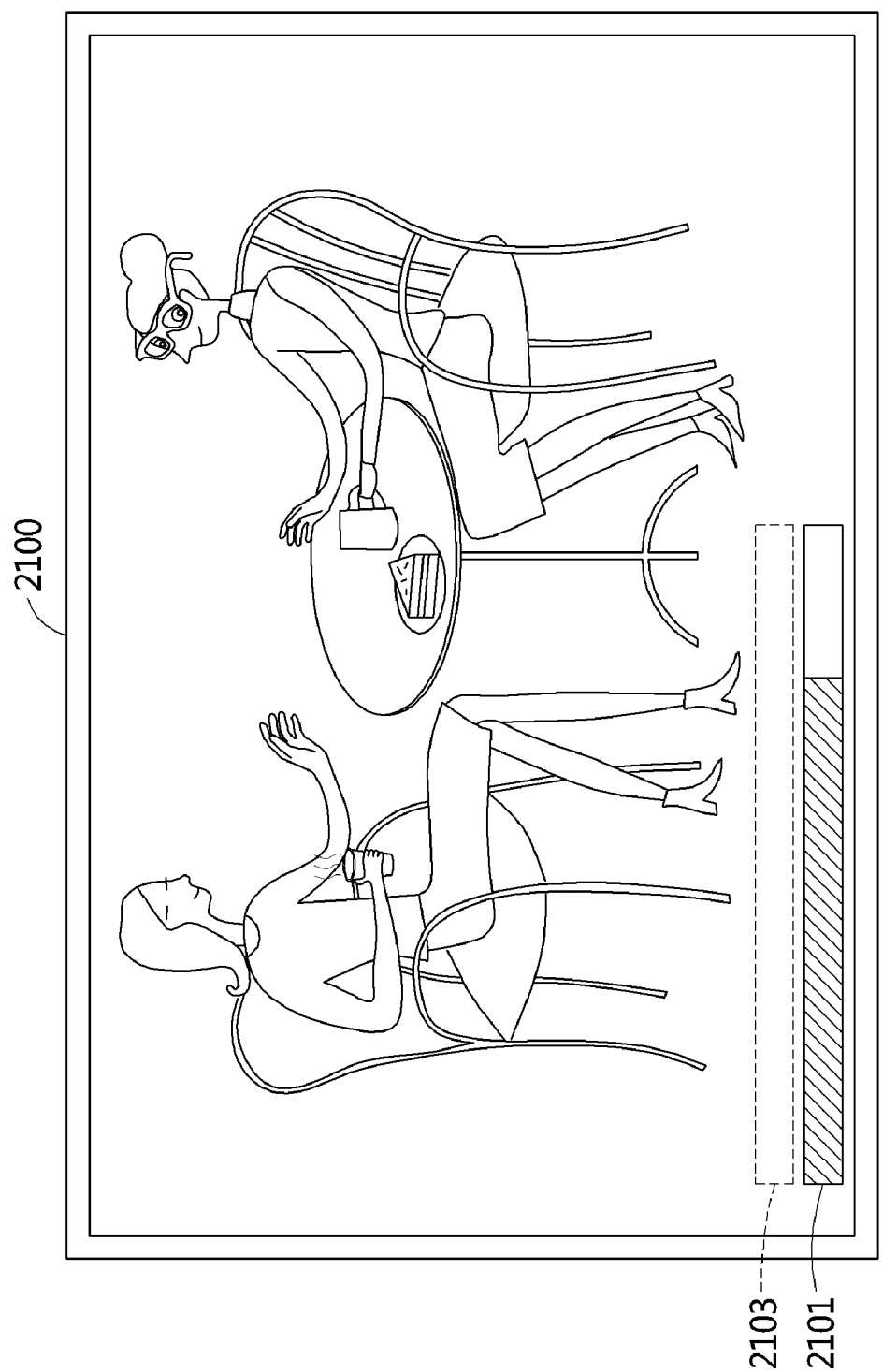

FIG. 21 shows an example of a drama playback screen 2100. In the case of a drama, the GUI processor 230 may perform processing so that a background volume graphical object 2103 is displayed in a transparent manner and a voice volume graphical object 2101 is displayed in the form of a bar.

In the case of a drama, the GUI processor 230 may process the background volume graphical object 2103 in a transparent manner or not to be displayed, considering that voice volume adjustment is mainly performed.

Figure 22:
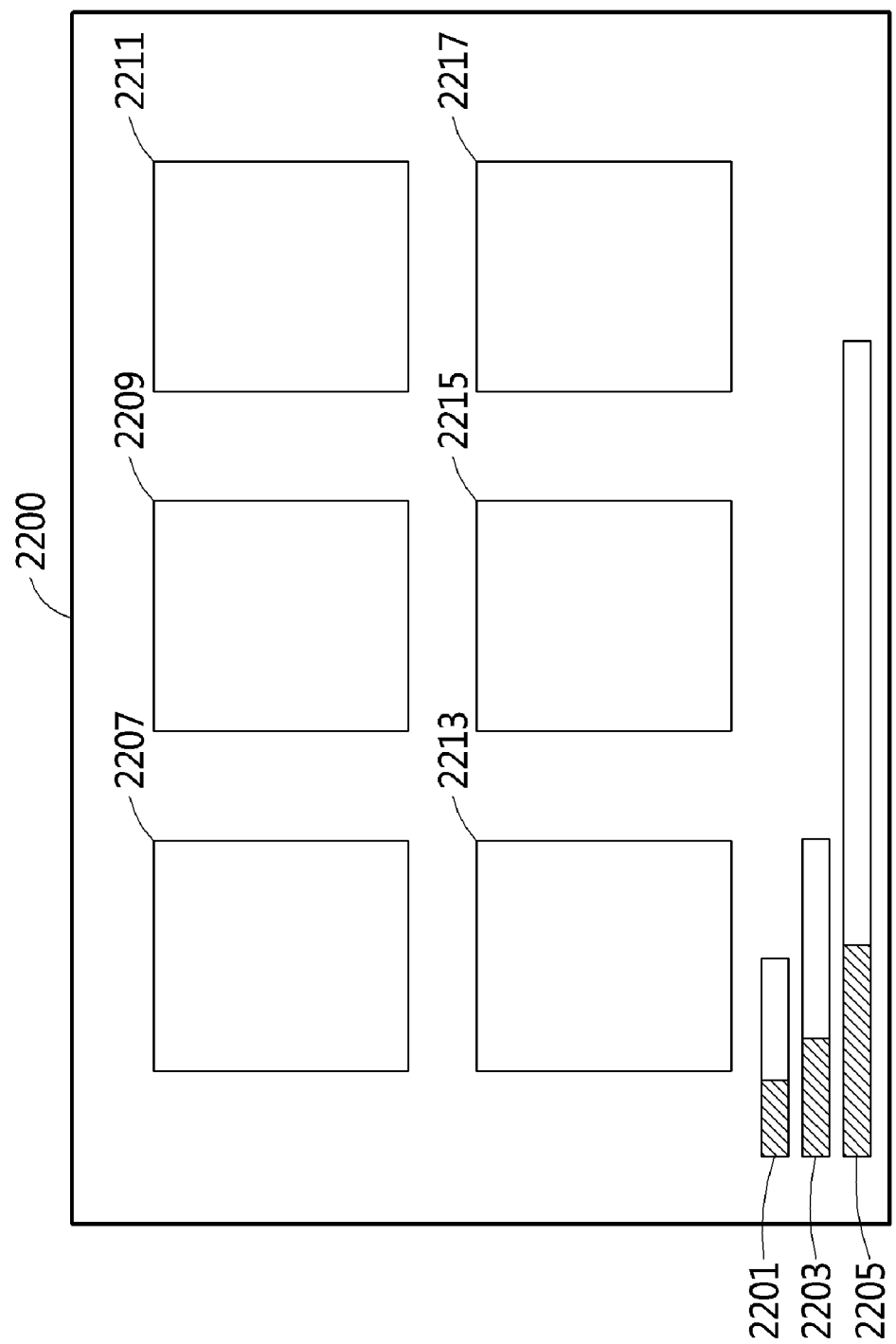

FIG. 22 shows an example of a mosaic view screen 2200 showing content information. When the current screen is the mosaic view screen 2200, the GUI processor 230 may perform processing so that a voice volume adjustment object 2201, a background volume adjustment object 2203, and an entire volume adjustment object 2205 are displayed at the bottom of the area where tiles 2207, 2209, 2211, 2213, 2215, and 2217 are displayed so that the tiles 2207, 2209, 2211, 2213, 2215, and 2217 are not covered.

Figure 23:
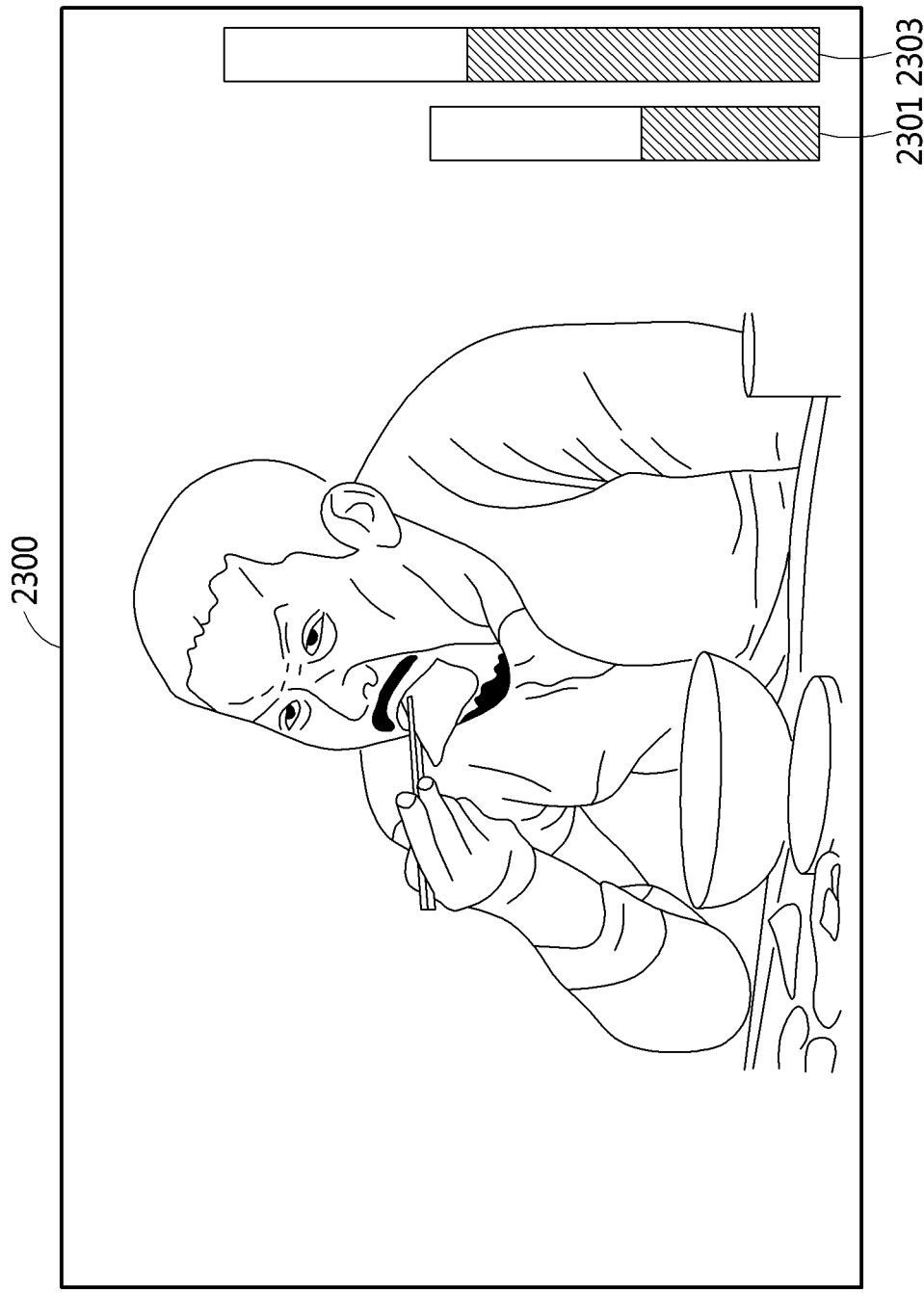
Figure 24:
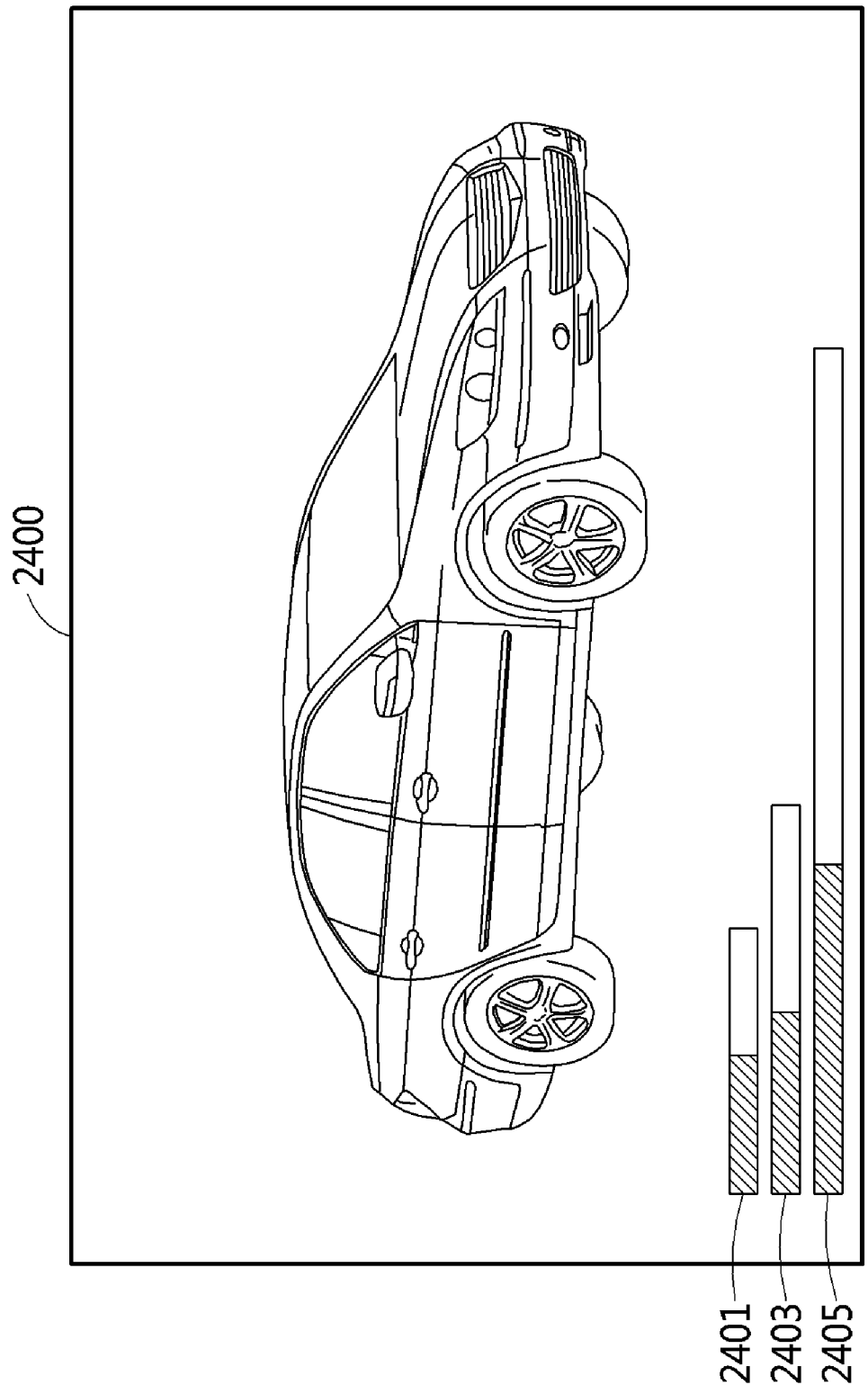

FIGS. 23 and 24 shows examples of advertisement screens 2300 and 2400.

The advertisement screen 2300 shown in FIG. 23 shows an example in which an advertisement model mainly speaks. In this case, the attributes of content may be classified as 'advertisement/voice'. In the case that the attributes of content is 'advertisement/voice', the GUI processor 230 may perform processing so that only a voice volume object 2301 and an entire volume object 2303 are displayed out of the center of the screen.

An advertisement screen 2400 shown in FIG. 24 shows an example in which background sounds are played while objects are shown. In this case, the attributes of content may be classified as 'advertisement/object/background'. A voice volume adjustment object 2401, a background volume adjustment object 2403, and an entire volume adjustment object 2405 may be displayed at the bottom of the screen. In this case, the voice volume adjustment object 2401 may be processed so as to be displayed or to be displayed in a transparent manner.

According to the present disclosure, entire volume control, voice control, and background control can be independently performed. In addition, a user can independently control voice and background according to user preference or situation. Thus, various audio environments and desired voice and background can be provided to users of various age groups.

According to one embodiment of the present disclosure, various audio control environments can be provided in accordance with the trend of diversification of types of multimedia content.

In addition, the present disclosure can provide an audio environment suitable for an environment in which multimedia content is provided in various manners.

In addition, the present disclosure can provide an audio source separation function that can be easily applied to existing multimedia provision systems irrespective of methods of generating audio sources.

In addition, the present disclosure can provide various audio control environments that can reflect user preference and that enable a user to easily and conveniently use multimedia content.

The apparatus described above may be implemented as a hardware component, a software component, and/or a combination of hardware components and software components. For example, the apparatus and components described in the embodiments may be achieved using one or more general purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of executing and responding to instructions. The processing device may execute an operating system (OS) and one or more software applications executing on the operating system. In addition, the processing device may access, store, manipulate, process, and generate data in response to execution of the software. For ease of understanding, the processing apparatus may be described as being used singly, but those skilled in the art will recognize that the processing apparatus may include a plurality of processing elements and/or a plurality of types of processing elements. For example, the processing apparatus may include a plurality of processors or one processor and one controller. Other processing configurations, such as a parallel processor, are also possible.

The software may include computer programs, code, instructions, or a combination of one or more of the foregoing, configure the processing apparatus to operate as desired, or command the processing apparatus, either independently or collectively. In order to be interpreted by a processing device or to provide instructions or data to a processing device, the software and/or data may be embodied permanently or temporarily in any type of a machine, a component, a physical device, a virtual device, a computer storage medium or device, or a transmission signal wave. The software may be distributed over a networked computer system and stored or executed in a distributed manner. The software and data may be stored in one or more computer-readable recording media.

The methods according to the embodiments of the present disclosure may be implemented in the form of a program command that can be executed through various computer means and recorded in a computer-readable medium. The computer-readable medium can store program commands, data files, data structures or combinations thereof. The program commands recorded in the medium may be specially designed and configured for the present disclosure or be known to those skilled in the field of computer software. Examples of a computer-readable recording medium include magnetic media such as hard disks, floppy disks and magnetic tapes, optical media such as CD-ROMs and DVDs, magneto-optical media such as floptical disks, or hardware devices such as ROMs, RAMs and flash memories, which are specially configured to store and execute program commands. Examples of the program commands include machine language code created by a compiler and high-level language code executable by a computer using an interpreter and the like. The hardware devices described above may be configured to operate as one or more software modules to perform the operations of the embodiments, and vice versa.

Although the present disclosure has been described with reference to limited embodiments and drawings, it should be understood by those skilled in the art that various changes and modifications may be made therein. For example, the described techniques may be performed in a different order than the described methods, and/or components of the described systems, structures, devices, circuits, etc., may be combined in a manner that is different from the described method, or appropriate results may be achieved even if replaced by other components or equivalents.

Therefore, other embodiments, other examples, and equivalents to the claims are within the scope of the following claims.

What is claimed is:

1. A content processing terminal of a multimedia content playback system, comprising:
   an audio signal processor for processing a voice signal separated from an audio source of multimedia content to produce a voice source and for processing a background signal separated from the audio source to produce a background source;
   a controller for controlling the audio signal processor to adjust at least one of the voice source and the background source in accordance with a volume control signal;
   a GUI processor for acquiring a graphical user interface (GUI) component corresponding to the volume control signal; and
   a display processor for processing the GUI component and providing the processed GUI component to a display device,
   wherein the audio signal processor sequentially separates the audio source through an audio separation algorithm based on a support vector machine (SVM) and an audio separation algorithm based on Probabilistic Latent Component Analysis (PLCA).

2. The content processing terminal according to claim 1, wherein the audio signal processor separates an audio source of the multimedia content into a first voice signal and a first background signal using a first audio separation procedure and separates the audio source into a second voice signal and a second background signal using a second audio separation procedure.

3. The content processing terminal according to claim 2, wherein the audio signal processor comprises a first audio signal separator for separating the audio source into the first voice signal and the first background signal;
   a second audio signal separator for separating the audio source into the second voice signal and the second background signal;
   a voice enhancer for generating enhanced voice sources based on signal features of each of the first and second voice signals; and
   a background enhancer for generating enhanced background sources based on signal features of each of the first and second background signals.

4. The content processing terminal according to claim 3, wherein the voice enhancer compares a feature value of the first voice signal and a feature value of the second voice signal by unit time or unit frequency, identifies differences between the feature values by the unit time or the unit frequency, and determines feature values of the enhanced voice sources in consideration of characteristics of the voice signals.

5. The content processing terminal according to claim 3, wherein the background enhancer compares a feature value of the first background signal and a feature value of the second background signal by unit time or unit frequency, identifies differences between the feature values by the unit time or the unit frequency, and determines feature values of the enhanced voice sources in consideration of characteristics of the background signals.

6. The content processing terminal according to claim 3, wherein the first audio signal separator comprises a first preprocessor for preprocessing the audio source and classifying the audio source into a first voice segment and a first background segment using a first audio separation algorithm; and
 a first separator for outputting the first voice signal and the first background signal by applying a probabilistic latent component analysis (PLCA)-based audio separation algorithm to the first voice segment and the first background segment, and
 the second audio signal separator comprises a second preprocessor for preprocessing the audio source and classifying the audio source into a second voice segment and a second background segment using a second audio separation algorithm different from the first audio separation algorithm; and
 a second separator for outputting the second voice signal and the second background signal by applying a probabilistic latent component analysis (PLCA)-based audio separation algorithm to the second voice segment and the second background segment.

7. The content processing terminal according to claim 6, wherein the first audio separation algorithm is a support vector machine (SVM)-based audio separation algorithm, and the second audio separation algorithm is a Gaussian mixture model (GMM)-based audio separation algorithm.

8. The content processing terminal according to claim 2, further comprising:
 a first production buffer for buffering the voice source; and
 a second production buffer for buffering the background source,
 wherein the controller transmits a control signal for controlling at least one of buffering time and synchronization of the voice source and the background source to the first and second production buffers.

9. The content processing terminal according to claim 2, wherein the audio signal processor comprises a first preprocessor for classifying the audio source into a first voice segment and a first background segment using a first audio separation algorithm;
 a second preprocessor for classifying the audio source into a second voice segment and a second background segment using a second audio separation algorithm different from the first audio separation algorithm;
 a voice enhancer for generating enhanced voice segments based on signal features of each of the first and second voice segments;
 a background enhancer for generating enhanced background segments based on signal features of each of the first and second background signals; and
 a separator for outputting an enhanced voice source and an enhanced background source by applying a probabilistic latent component analysis-based audio separation algorithm to the enhanced voice segment and the enhanced background segment.

10. The content processing terminal according to claim 2, wherein the audio signal processor comprises a selector for selecting a voice enhancement procedure or a background enhancement procedure according to a type of the multimedia content or user setting;
 a voice enhancement audio source part activated in the voice enhancement procedure; and
 a background enhancement audio source part activated in the background enhancement procedure,
 wherein the voice enhancement audio source part outputs a sound in which the voice source is enhanced among the voice source and the background source; and
 the background enhancement audio source part outputs a sound in which the background source is enhanced among the voice source and the background source.

11. The content processing terminal according to claim 1, wherein the volume control signal comprises at least one of a signal for adjusting a volume level of the voice source independently of the background source, a signal for adjusting a volume level of the background source independently of the voice source, and a signal for adjusting a volume level of a combination of the voice source and the background source.

12. The content processing terminal according to claim 1, wherein the volume control signal is received from a remote controller, wherein the remote controller comprises volume adjustment buttons capable of independent volume control of voice and background,
 wherein, when the volume control signal is input through the volume adjustment buttons, the remote controller transmits the volume control signal to the content processing terminal; and
 when input signals of number keys are received from the remote controller within a predetermined time after receiving the volume control signal, the controller controls the audio signal processor to adjust at least one of the voice source and the background source at a volume level corresponding to the input signals of number keys.

13. The content processing terminal according to claim 1, wherein the controller stores the volume control information selected by a user for each type or attributes of the multimedia content, and generates information about the user's preferred volume level settings for multimedia content of identical types or attributes based on the stored volume control information.

14. The content processing terminal according to claim 13, wherein the controller transmits the information about the user's preferred volume level settings to a server providing the multimedia content, or shares the information with an external terminal connected to the content processing terminal.

15. The content processing terminal according to claim 1, wherein, for each type or attributes of the multimedia content, the controller determines volume level adjustment features of the voice source, the background source, and an entire audio source having the voice source and the background source combined, and controls the audio signal processor based on the volume level adjustment features.

16. The content processing terminal according to claim 15, wherein, when a type or attributes of the multimedia content corresponds to voice enhancement, the controller controls a volume level of the voice source independently of a volume level of the background source when adjusting a volume level of the entire audio source, wherein a volume level adjustment unit of the voice source is set to be smaller than a volume level adjustment unit of the background source.

17. The content processing terminal according to claim 1, wherein the GUI processor acquires a graphical object of a GUI component corresponding to the volume control signal according to the type or attributes of the multimedia content, and determines an arrangement position of the graphical object based on the type or attributes of the multimedia content, wherein the graphical object comprises at least one of a voice volume adjustment object, a background volume adjustment object, and an entire volume adjustment object.

18. A content processing terminal of a multimedia content playback system, comprising:
 a first audio signal separator for separating an audio source of multimedia content into a first voice signal and a first background signal sequentially using an audio separation algorithm based on a support vector machine (SVM) and an audio separation algorithm based on Probabilistic Latent Component Analysis (PLCA);
 a second audio signal separator for separating the audio source of the multimedia content into a second voice signal and a second background signal using an audio separation algorithm;
 a voice enhancer for generating enhanced voice sources based on signal features of each of the first and second voice signals;
 a background enhancer for generating enhanced background sources based on signal features of each of the first and second background signals; and
 a volume controller for separating a volume level of the enhanced voice source and a volume level of the enhanced background source based on a volume control signal.

19. A content processing terminal of a multimedia content playback system, comprising:
 a selector for selecting a voice enhancement procedure or a background enhancement procedure according to a type of multimedia content or user setting;
 a voice enhancement audio source part, in which a first audio separation function of separating an audio source of the multimedia content into a first voice signal and a first background signal using a first audio separation algorithm and a voice enhancement function of generating an enhanced voice source are activated in the voice enhancement procedure;
 a background enhancement audio source part, in which a second audio separation function of separating an audio source of the multimedia content into a second voice signal and a second background signal using a second audio separation algorithm and a background enhancement function of generating an enhanced background source are activated in the background enhancement procedure; and
 a volume controller for separating a volume level of the enhanced voice source and a volume level of the enhanced background source based on a volume control signal, wherein, in the voice enhancement audio source part, the voice enhancement function is deactivated in the background enhancement procedure, and in the background enhancement audio source part, the background enhancement function is deactivated in the voice enhancement procedure;
 the voice enhancement function serves to generate enhanced voice sources based on signal features of each of the first and second voice signals; and
 the background enhancement function serves to generate enhanced background sources based on signal features of each of the first and second background signals.

20. A method of providing an audio environment of a content processing terminal, comprising:
 processing a voice signal separated from an audio source of multimedia content to produce a voice source;
 processing a background signal separated from the audio source to produce a background source;
 adjusting at least one of the voice source and the background source according to a volume control signal; and
 confirming a graphical user interface (GUI) component corresponding to the volume control signal, processing the GUI component, and providing the processed GUI component to a display device,
 wherein the step of processing the voice signal further comprises:
 separating the audio source through an audio separation algorithm based on a support vector machine (SVM), and
 further separating the audio source through an audio separation algorithm based on Probabilistic Latent Component Analysis (PLCA).

21. The method according to claim 20,
 wherein the processing of the voice signal further comprises:
 separating the audio source of the multimedia content into a first voice signal and a first background signal using a first audio separation procedure;
 separating the audio source into a second voice signal and a second background signal using a second audio separation procedure; and
 processing at least one of the first and second voice signals to produce the voice source, and
 wherein the processing of the background source comprises processing at least one of the first and second background signals to produce the background source.

* * * * *